US012579580B2

(12) United States Patent
Amancha

(10) Patent No.: US 12,579,580 B2
(45) Date of Patent: Mar. 17, 2026

(54) SYSTEMS AND METHODS FOR GENERATING GRAPHICAL USER INTERFACES RELATING TO DETERMINED PARAMETRIC EVENTS

(71) Applicant: STATE FARM MUTUAL AUTOMOBILE INSURANCE COMPANY, Bloomington, IL (US)

(72) Inventor: Steve Amancha, Tempe, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/137,323

(22) Filed: Apr. 20, 2023

(65) Prior Publication Data

US 2023/0351518 A1     Nov. 2, 2023

Related U.S. Application Data

(60) Provisional application No. 63/423,341, filed on Nov. 7, 2022, provisional application No. 63/336,400, filed
(Continued)

(51) Int. Cl.
*G06Q 40/08* (2012.01)
*G06F 3/0484* (2022.01)

(52) U.S. Cl.
CPC ........... *G06Q 40/08* (2013.01); *G06F 3/0484* (2013.01)

(58) Field of Classification Search
CPC ............................. G06Q 40/08; G06F 3/0484
See application file for complete search history.

(56) References Cited

U.S. PATENT DOCUMENTS 3,226,648 A * 12/1965 Davidson .................. G06F 1/12
331/49
5,748,485 A * 5/1998 Christiansen .......... G06Q 20/20
705/16
(Continued)

FOREIGN PATENT DOCUMENTS

EP     3239686 A1     11/2017
EP     3578433 B1     8/2020
(Continued)

OTHER PUBLICATIONS

5."5 Apps to Have on Your Phone in Case of a Car Accident", Sep. 2018, 5 pages. Available at: https://srgslaw.com/blog/apps-to-have-on-phone-in-case-of-car-accident/ (Year: 2018).*
(Continued)

Primary Examiner — Gregory Harper
(74) *Attorney, Agent, or Firm* — MARSHALL, GERSTEIN & BORUN LLP

(57) ABSTRACT

Systems and methods are disclosed for providing a graphic user interface. The systems and methods may (1) receive an indication of a parametric event involving a vehicle; (2) provide a series of component graphic user interfaces, wherein the component graphic user interfaces may be configured to (i) initiate a claim filing, (ii) communicate with an insurer entity, (iii) communicate with an emergency response entity, (iv) communicate with a towing service entity, (v) communicate with a taxi or ride-share service entity, (vi) communicating with a vehicle repair service entity, (vii) communicating with a vehicle salvage entity, and/or (viii) communicating with a vehicle rental service entity; (3) detect one or more user interactions that may include one or more selections of the one or more actions; (4) perform the one or more actions; and/or (5) record a
(Continued)

transaction indicating that the one or more actions has been performed to the blockchain.

17 Claims, 14 Drawing Sheets

Related U.S. Application Data on Apr. 29, 2022, provisional application No. 63/332,764, filed on Apr. 20, 2022.

(56) References Cited

U.S. PATENT DOCUMENTS

| | | | | |
|---|---|---|---|---|
| 6,799,209 | B1 * | 9/2004 | Hayton | H04L 67/535 |
| | | | | 709/217 |
| 9,311,271 | B2 | 4/2016 | Wright | |
| 9,633,487 | B2 | 4/2017 | Wright | |
| 9,786,154 | B1 * | 10/2017 | Potter | G08B 21/02 |
| 9,830,748 | B2 | 11/2017 | Rosenbaum | |
| 9,990,782 | B2 | 6/2018 | Rosenbaum | |
| 10,107,708 | B1 * | 10/2018 | Schick | G06Q 40/08 |
| 10,192,369 | B2 | 1/2019 | Wright | |
| 10,198,879 | B2 | 2/2019 | Wright | |
| 10,269,190 | B2 | 4/2019 | Rosenbaum | |
| 10,467,824 | B2 | 11/2019 | Rosenbaum | |
| 10,713,727 | B1 * | 7/2020 | Floyd | H04L 9/50 |
| 10,719,501 | B1 * | 7/2020 | Leise | G06Q 40/00 |
| 10,740,849 | B1 * | 8/2020 | Leise | G06Q 40/12 |
| 10,776,879 | B1 * | 9/2020 | Floyd | G06Q 40/08 |
| 10,805,068 | B1 * | 10/2020 | Leise | G06F 21/602 |
| 10,832,344 | B1 * | 11/2020 | Engelhorn | G06F 3/04842 |
| 10,891,694 | B1 | 1/2021 | Leise et al. | |
| 10,943,307 | B1 * | 3/2021 | Leise | G06Q 10/20 |
| 11,062,605 | B1 | 7/2021 | McFarland, Jr. | |
| 11,144,997 | B2 * | 10/2021 | Chappell | G06Q 20/3223 |
| 11,227,452 | B2 | 1/2022 | Rosenbaum | |
| 11,269,849 | B1 * | 3/2022 | Leise | H04L 9/0637 |
| 11,315,193 | B1 * | 4/2022 | Kim | G06Q 20/3678 |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 11,682,289 | B1 * | 6/2023 | Taylor | G07C 5/0816 |
| | | | | 701/31.7 |
| 12,014,425 | B2 | 6/2024 | Patt et al. | |
| 2006/0206246 | A1 | 9/2006 | Walker | |
| 2007/0136372 | A1 * | 6/2007 | Proctor | H04L 47/762 |
| 2008/0209965 | A1 * | 9/2008 | Maack | G06F 21/554 |
| | | | | 70/262 |
| 2013/0297468 | A1 * | 11/2013 | Hirsch | G06Q 10/109 |
| | | | | 705/32 |
| 2017/0214753 | A1 | 7/2017 | Sandoval | |
| 2017/0220998 | A1 * | 8/2017 | Horn | H04L 51/52 |
| 2018/0018723 | A1 | 1/2018 | Nagla et al. | |

| | | | | |
|---|---|---|---|---|
| 2018/0218456 | A1 | 8/2018 | Kolb et al. | |
| 2018/0354525 | A1 | 12/2018 | Lindelöf | |
| 2019/0057454 | A1 * | 2/2019 | Komenda | H04L 9/3242 |
| 2019/0373330 | A1 * | 12/2019 | Bloch | H04N 21/4532 |
| 2020/0074853 | A1 * | 3/2020 | Miller | G08G 1/012 |
| 2020/0122773 | A1 | 4/2020 | Deshpande | |
| 2020/0267503 | A1 | 8/2020 | Watkins et al. | |
| 2020/0393254 | A1 * | 12/2020 | Gardner | G01C 21/3438 |
| 2020/0402149 | A1 * | 12/2020 | Dutta | G06Q 30/0282 |
| 2020/0402150 | A1 * | 12/2020 | Gardner | G06Q 10/06315 |
| 2020/0402190 | A1 | 12/2020 | Nelluri | |
| 2020/0402391 | A1 * | 12/2020 | Dutta | G07C 5/008 |
| 2020/0410623 | A1 * | 12/2020 | Vahabzadeh | G06Q 10/02 |
| 2021/0043061 | A1 * | 2/2021 | Potter | G08B 25/00 |
| 2021/0056642 | A1 * | 2/2021 | Engelhorn | G06F 3/0484 |
| 2021/0076863 | A1 * | 3/2021 | Craig | A47J 31/525 |
| 2021/0133888 | A1 * | 5/2021 | Leise | G06F 16/9024 |
| 2021/0166327 | A1 * | 6/2021 | Leise | H04L 9/3239 |
| 2021/0174456 | A1 * | 6/2021 | Mousty | G06F 3/0486 |
| 2021/0209693 | A1 * | 7/2021 | Brandmaier | G06Q 40/08 |
| 2021/0216525 | A1 * | 7/2021 | Leise | G06Q 30/0611 |
| 2021/0232642 | A1 | 7/2021 | Ricci | |
| 2021/0264530 | A1 * | 8/2021 | Leise | H04L 9/0637 |
| 2021/0264531 | A1 * | 8/2021 | Leise | H04L 9/3239 |
| 2021/0291691 | A1 | 9/2021 | Lu | |
| 2021/0319632 | A1 | 10/2021 | Dutta et al. | |
| 2021/0326992 | A1 * | 10/2021 | Leise | G06N 20/00 |
| 2021/0342946 | A1 * | 11/2021 | Leise | G06Q 20/4015 |
| 2022/0092893 | A1 | 3/2022 | Rosenbaum | |
| 2022/0194403 | A1 * | 6/2022 | McFarland, Jr. | B60K 35/28 |
| 2022/0284627 | A1 | 9/2022 | Johnson et al. | |
| 2022/0340148 | A1 | 10/2022 | Rosenbaum | |
| 2023/0053103 | A1 * | 2/2023 | Roberts | B60R 25/102 |
| 2023/0060300 | A1 | 3/2023 | Rosenbaum | |
| 2023/0115771 | A1 * | 4/2023 | Patt | G06Q 40/08 |
| | | | | 705/4 |
| 2023/0116840 | A1 * | 4/2023 | Patt | G06Q 40/08 |
| | | | | 705/4 |
| 2023/0281721 | A1 * | 9/2023 | O'Kane | G06F 16/258 |
| | | | | 705/4 |

FOREIGN PATENT DOCUMENTS

| | | | | |
|---|---|---|---|---|
| EP | 3730375 | B1 | 10/2021 | |
| EP | 3960576 | A1 | 3/2022 | |
| EP | 4190659 | A1 | 6/2023 | |
| EP | 4190660 | A1 | 6/2023 | |
| WO | WO-2021146592 | A1 * | 7/2021 | G06F 9/453 |
| WO | WO-2021208754 | A1 | 10/2021 | |

OTHER PUBLICATIONS

Alejandro Alvarado, et al., "The Value of On-Scene FNOL", Jul. 2020, 12 pages. Available at: https://cdn2.hubspot.net/hubfs/2932510/Agero_WhitePaper_OnScene_FNOL_FINAL.pdf (Year: 2020).*

* cited by examiner

302c

300c

304c

306c

308c

302g

300g

304g

306g

302h

304h

300h

306h

308h

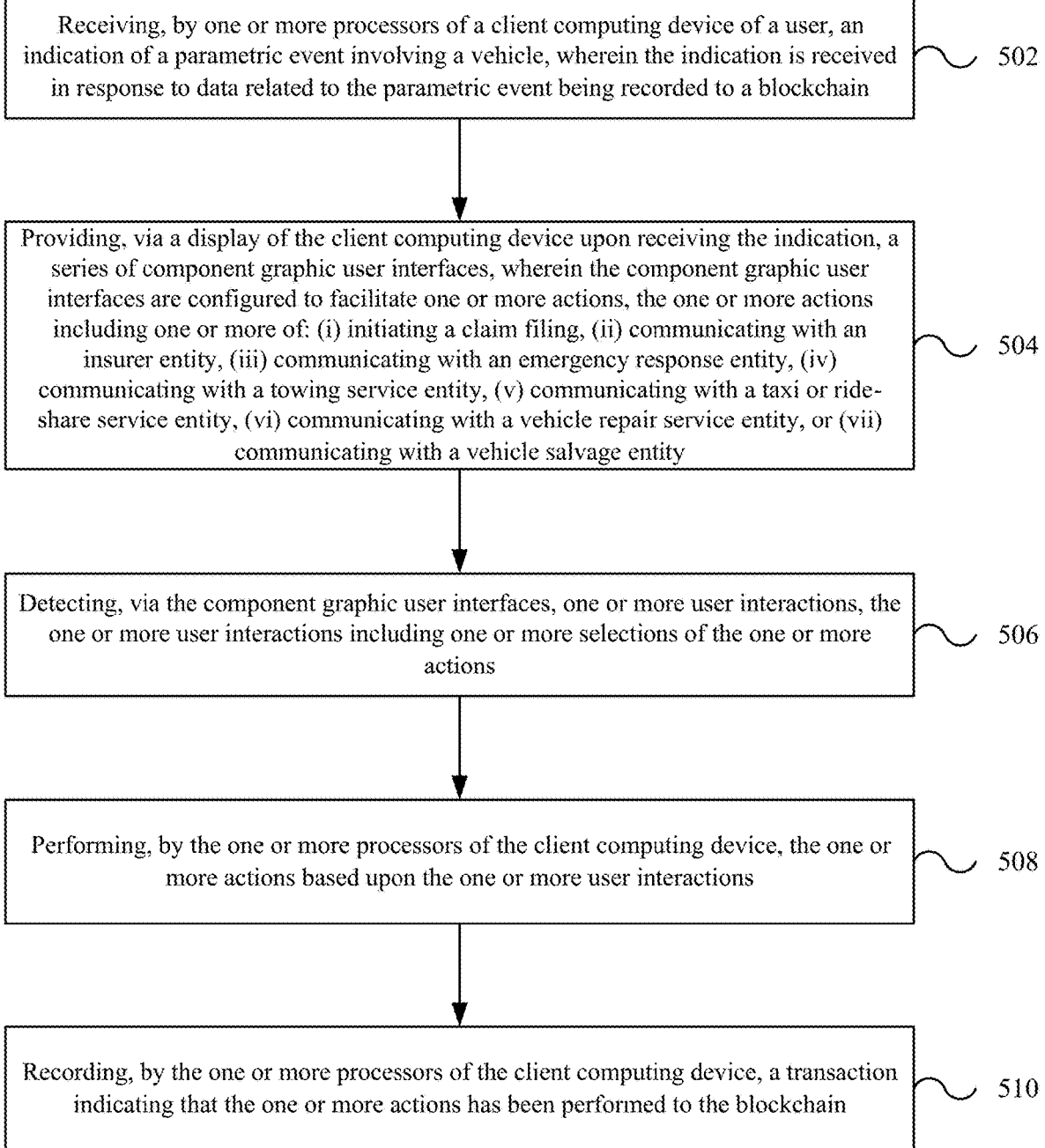

Receiving, by one or more processors of a client computing device of a user, an indication of a parametric event involving a vehicle, wherein the indication is received in response to data related to the parametric event being recorded to a blockchain — 502

Providing, via a display of the client computing device upon receiving the indication, a series of component graphic user interfaces, wherein the component graphic user interfaces are configured to facilitate one or more actions, the one or more actions including one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, or (vii) communicating with a vehicle salvage entity — 504

Detecting, via the component graphic user interfaces, one or more user interactions, the one or more user interactions including one or more selections of the one or more actions — 506

Performing, by the one or more processors of the client computing device, the one or more actions based upon the one or more user interactions — 508

Recording, by the one or more processors of the client computing device, a transaction indicating that the one or more actions has been performed to the blockchain — 510

FIG. 5

SYSTEMS AND METHODS FOR GENERATING GRAPHICAL USER INTERFACES RELATING TO DETERMINED PARAMETRIC EVENTS

CROSS-REFERENCE TO RELATED APPLICATIONS

This application claims priority to and the benefit of U.S. Patent Application No. 63/423,341, entitled "Systems and Methods for Generating a Smart Contract for a Parametric Event", filed Nov. 7, 2022, U.S. Patent Application No. 63/336,400, entitled "Systems and Methods for Generating a Smart Contract for a Parametric Event", filed Apr. 29, 2022, and U.S. Patent Application No. 63/332,764, entitled "Systems and Methods for Generating a Smart Contract for a Parametric Event", filed Apr. 20, 2022 the entire contents of which are hereby expressly incorporated herein by reference.

TECHNICAL FIELD

The present disclosure generally relates to generating smart contracts for a distributed ledger that governs vehicle transactions or events, and more particularly, generating smart contracts based upon analysis of vehicle sensor data that indicates various parametric events associated with vehicle loss.

BACKGROUND

Conventionally, when an operator of a vehicle suffers vehicle loss (e.g., theft of items inside the vehicle, a vehicle collision, a major collision resulting in a vehicle beyond repair, etc.), the operator manually contacts (e.g., via a phone call) an insurer entity of the vehicle to first report the loss, which may be referred to as First Notice of Loss (FNOL). The operator (and/or passengers, witnesses to the loss, etc.) may provide the insurer entity with details of the vehicle loss, such as the time and location of the vehicle loss, parties involved, etc., for the insurer entity to act (e.g., initiate a claims process).

Generally speaking, the insurer entity may rely on reporting from the operator to initiate the FNOL process, and thus may be considered to employ a reactive approach for assisting the operator. The operator may also contact other entities, such as emergency response entities, tow servicing entities, taxi or ride-share service entities, vehicle repair service entities, vehicle salvage entities, rental car entities, etc. depending on the severity of the vehicle loss. Various entities may also contact each other. For example, an insurer may rely on a vehicle repair entity to assess repair costs for damage incurred in a collision, and these entities may need to agree on damages calculations and a payment amount to settle an insurance claim.

In some situations, loss information reported by the operator to a particular entity may not be accurate, such as when the operator's cognition is impaired during an accident, when the operator is suffering from emotion distress caused by an accident, when the operator forgets details by waiting too long to report the accident, or when the operator does not properly document the accident (e.g., with pictures) to name a few scenarios, and thus such loss information may be considered highly subjective, and in some cases, entirely inaccurate. Various entities may need to verify such information, such as by manually inspecting the vehicle involved in the loss, contacting parties involved in the loss or any witnesses, etc.

Accordingly, to assist the operator, various entities may need to exchange and/or verify information relating to the loss, e.g., where the loss occurred, severity of the loss, facts to determine which party was at fault, etc. This exchange and/or verification of information may be cumbersome and time consuming. Delays for various reasons (e.g., the operator delays reporting of the vehicle loss, verifying the operator's account of the vehicle loss, etc.) may further delay assistance for the operator.

SUMMARY

The disclosed embodiments generally relate to determining vehicle loss based upon vehicle sensor data received from the sensors installed on, or within, the vehicle to initiate an "Instantaneous" Notice of Loss (INOL) for proactively assisting an operator of the vehicle, prior to receiving any notice from the operator of the occurrence of the loss. The vehicle sensor data can be interpreted to be the "ground truth" of the vehicle loss, and thus need not be necessarily verified with manual inspections of the vehicle, for example. Advantageously, for example, an insurer of the vehicle may instantaneously determine that a vehicle loss occurred based upon the received vehicle sensor data, prior to receiving any report of loss information (e.g., phone call from the operator, pictures documenting the loss, police report, etc.) from the operator of the vehicle. In this way, the insurer of the vehicle may employ a proactive approach to initiate processes on behalf of the operator, such as initiating INOL rather than waiting for the operator to initiate FNOL, anticipating that the operator may need assistance, and contacting appropriate entities (e.g., emergency medical technicians (EMTs), police, towing services, taxi or ride-share services, repair shops, body shops, salvage vendors, etc.) that the operator has authorized the insurer to contact in advance if the operator was to experience vehicle loss.

To employ the proactive approach, a blockchain-based solution is described herein. A large dataset of vehicle sensor data from numerous vehicles may be analyzed to determine one or more parametric events. For example, analysis of the large dataset of vehicle sensor data from numerous vehicles may indicate that a broken window of vehicles correlates to a parametric event of theft of item(s) in vehicles. As another example, analysis of vehicle sensor data may indicate that isolated damage of vehicles (e.g., the front but not the back) correlates to a parametric event of a relatively small collision (e.g., the vehicles drove into trees, mailboxes, etc.), whereas extensive damage of vehicles (e.g., body of vehicles severely damaged) correlates to a parametric event of a relatively large collision (e.g., the vehicles suffered total loss beyond repair). For each parametric event determined from the large dataset of vehicle sensor data, a corresponding smart contract is generated for deployment onto a shared leger (i.e., the blockchain), to define action(s) (e.g., initiating an INOL process, contacting an emergency response entity, towing service entity, taxi or ride-share services entity, vehicle repair service entity, vehicle salvage entity, etc.) when the parametric event involving a vehicle actually occurs.

The blockchain operated by a group of network entities according to a set of consensus rules manages and resolves vehicle loss according to the generated smart contracts. Evidence regarding the vehicle loss (i.e., vehicle sensor data) and in some cases, any supplementation information (e.g., weather data indicating weather conditions at the moment of the vehicle loss, image data indicating photographic evidence of the vehicle loss) is sent to the blockchain by one or more entities (e.g., sensors installed on or within the vehicle, supplemental sources), which are routed to any of the smart contracts described above that are deployed on the blockchain. Upon execution of these smart contracts, assistance may be provided to the operator of the vehicle prior to receiving any report of loss information from the operator of the vehicle.

In some embodiments, a computer-implemented method for providing a graphic user interface may be provided. The method may be implemented via one or more local and/or remote processors, transceivers, sensors, servers, memory units, mobile devices, wearables, smart glasses, augmented reality glasses, virtual reality headsets, and/or other electronic and/or electrical components. In one instance, the method may include: (1) receiving, by one or more processors of a client computing device of a user, an indication of a parametric event involving a vehicle, wherein the indication may be received in response to data related to the parametric event being recorded to a blockchain; (2) providing, via a display of the client computing device upon receiving the indication, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detecting, via the component graphic user interfaces, one or more user interactions, the one or more user interactions may include one or more selections of the one or more actions; (4) performing, by the one or more processors of the client computing device, the one or more actions based upon the one or more user interactions; and/or (5) recording, by the one or more processors of the client computing device, a transaction indicating that the one or more actions has been performed to the blockchain. The method may include additional, less, or alternate functionality, including that discussed elsewhere herein.

In other embodiments, a computer system for providing a graphic user interface may be provided. The computer system may be configured to include one or more local and/or remote processors, transceivers, sensors, servers, memory units, mobile devices, wearables, smart glasses, augmented reality glasses, virtual reality headsets, and/or other electronic and/or electrical components. In one instance, the computer system may include one or more processors; and/or a non-transitory program memory coupled to the one or more processors and/or storing executable instructions that, when executed by the one or more processors, cause the computer system to: (1) receive an indication of a parametric event involving a vehicle, wherein the indication may be received in response to data related to the parametric event being recorded to a blockchain; (2) provide, via a display of the client computing device, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detect, via the component graphic user interfaces, one or more user interactions, the one or more user interactions may include one or more selections of the one or more actions; (4) perform the one or more actions based upon the one or more user interactions; and/or (5) record a transaction indicating that the one or more actions has been performed to the blockchain. The computer system may be configured to include additional, less, or alternate functionality, including that discussed elsewhere herein.

In yet other embodiments, a tangible, a non-transitory computer-readable medium may store executable instructions for providing a graphic user interface may be provided. The executable instructions, when executed, may cause one or more processors (e.g., the one or more processors 102) to: (1) receive an indication of a parametric event involving a vehicle, wherein the indication may be received in response to data related to the parametric event being recorded to a blockchain; (2) provide, via a display of the client computing device, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detect, via the component graphic user interfaces, one or more user interactions, the one or more user interactions may include one or more selections of the one or more actions; (4) perform the one or more actions based upon the one or more user interactions; and/or (5) record a transaction indicating that the one or more actions has been performed to the blockchain. The instructions may direct additional, less, or alternate functionality, including that discussed elsewhere herein.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various embodiments of the system and methods disclosed herein. It should be understood that each figure depicts a particular embodiment of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 5 depicts an exemplary computer-implemented method for providing an example graphic user interface for implementing the techniques, systems, and methods disclosed herein.

Figure 1:
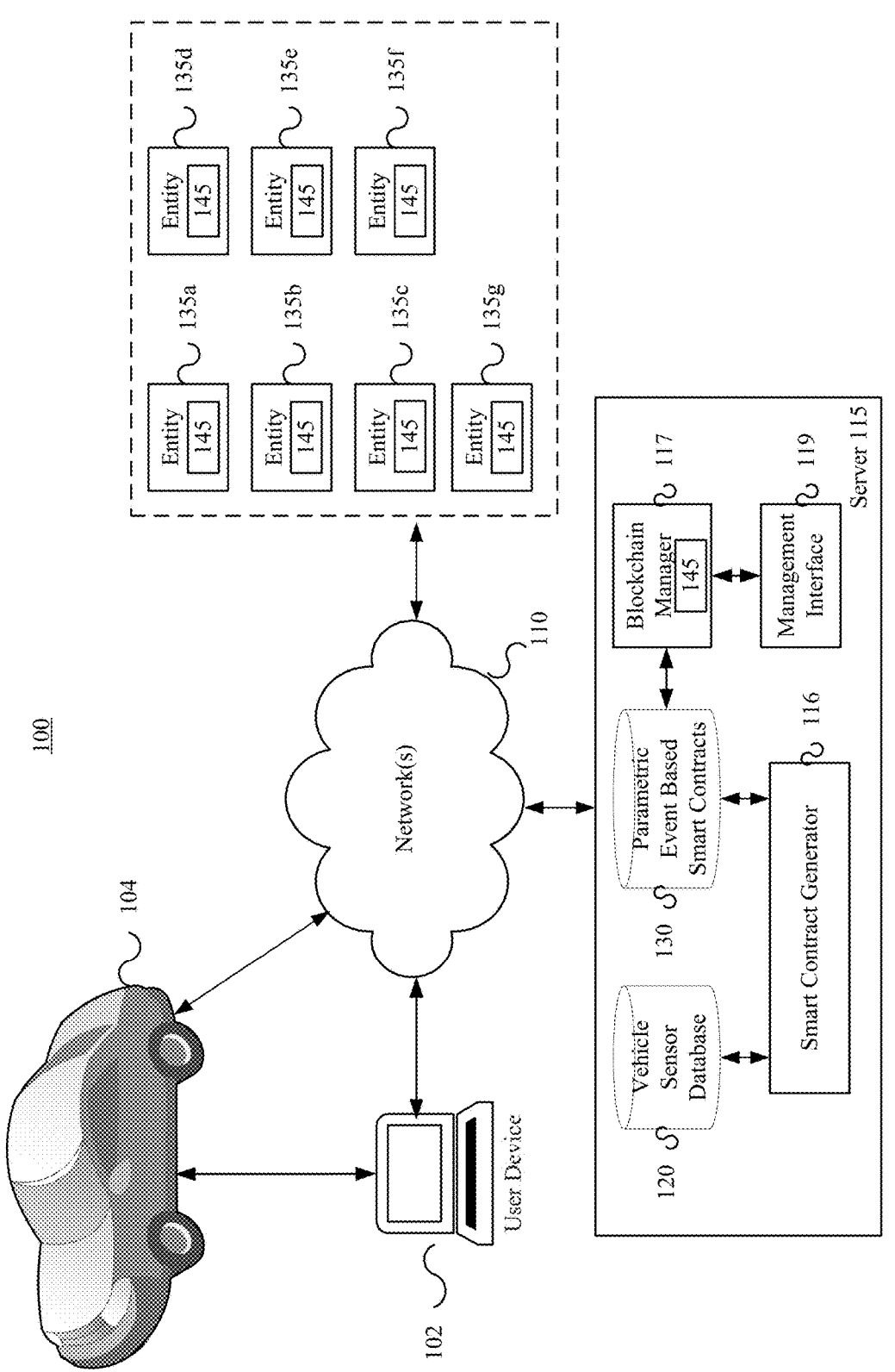
FIG. 1 depicts an exemplary computing environment including components, apparatuses, and devices for implementing techniques, systems, and methods disclosed herein.

The figures depict the present embodiments for purposes of illustration only. One skilled in the art will readily recognize from the following discussion that alternate embodiments of the structures and methods illustrated herein may be employed without departing from the principles of the invention described herein.

DETAILED DESCRIPTION

Traditionally, business entities and central authorities involved in resolving vehicle loss (e.g., theft of items inside the vehicle, a vehicle collision, a major collision resulting in a vehicle beyond repair, etc.) react to a report of the vehicle loss from a customer (e.g., operator of the vehicle involved in the vehicle loss), by storing loss information (e.g., transcription of a phone call from an operator of a vehicle involved in the vehicle loss, pictures documenting the vehicle loss, police report, etc.) in databases or ledgers. Often these databases and ledgers are held by the business entities and must be reconciled to achieve consensus as to the validity of the information stored therein. Alternatively, a central authority may be responsible for determining the validity of information stored in a database or a ledger and functioning as an arbiter of consensus for interested parties.

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer (P2P) network. The blockchain may be comprised of groupings of transactions organized together into a "block," and ordered sequentially (thus the term "blockchain"). Nodes may join and leave the blockchain network over time, and may obtain blocks that were propagated while the node was gone from peer nodes. Nodes may maintain addresses of other nodes, and exchange addresses of known nodes with one another to facilitate the propagation of new information across the network in a decentralized, P2P manner.

In one application of the blockchain, each new block may be cryptographically linked to the previous block in order to form the blockchain. More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to some embodiments, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution may also depend on the particular hash values for each transaction within the blockchain, if the solving node attempted to modify any transaction, the solution would not be verified by the other nodes.

More particularly, if a single node attempts to modify a prior transaction within the blockchain, a cascade of different hash values may be generated for each tier of the cryptographic combination technique. This may result in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node may be readily recognized as including an improper modification and rejected by the consensus. This inability to modify past transactions lead to blockchains being generally described as trusted, secure, and/or immutable.

The nodes that share the blockchain form what is referred to herein as the blockchain network. The nodes in the blockchain network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supplies a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules may be propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule may be disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Third-party intermediaries who assist in the resolution of vehicle loss may thus be disintermediated from the process by a decentralized blockchain.

The validation activities of nodes applying consensus rules on a blockchain network may take various forms. In some embodiments, the validating nodes execute code contained in "smart contracts" and distributed consensus is expressed as the network nodes agreeing on the output of the executed code.

Blockchains may be deployed in a public, decentralized, and permissionless manner meaning that any party may view the blockchain, submit new information to be added to the blockchain, or join the network as a validating node. Other blockchains are private (e.g., permissioned ledgers) that keep chain data private among a group of entities authorized to participate in the blockchain network.

The present embodiments generally relate to systems and methods for using a blockchain to record and manage information related to proactive resolution of vehicle loss. The blockchain may be either a public or permissioned ledger.

Exemplary Smart Contract Functionality

In particular, the present embodiments may relate to, inter alia, creating and deploying smart contracts onto a blockchain that are used to enforce agreements related to proactive resolution of vehicle loss, made between a node (interchangeably referred herein as an "entity" or "party" or "participant") and an operator of the vehicle involved in the vehicle loss, or between/among nodes (interchangeably referred herein as "entities" or "parties" or "participants") of a blockchain system (interchangeably referred herein as a "blockchain network"). Potential nodes may include an insurer entity, emergency response entity, towing services entity, taxi or ride-share services entity, vehicle repair service entity, vehicle salvage entity, vehicle manufacturer entity, and a State Department of Motor Vehicles (DMV) entity, just to name a few.

Each smart contract described herein may be a set of code that is deployed at a particular address on the blockchain, that when executed causes action(s) defined in the smart contract to be automatically initiated when certain parametric event(s) defined in the smart contract occur. These action(s) may involve initiating processes for servicing the vehicle, and one or more entities exchanging information about the vehicle with an operator of the vehicle (e.g., driver of the vehicle, owner of the vehicle, policy holder of the vehicle) or one or more other entities. For instance, the smart contracts may relate to (1) initiating an INOL process, (2) tracking maintenance or repair work that has been, or is to be, performed on a vehicle, (3) contacting first responders, (4) contacting towing services, repair services, taxi services, ride-share services, and/or the like. As such, the blockchain may have various usages, and may allow for the introduction of new capabilities. By using the blockchain, the exchange of information included in transactions is sped up, and by utilizing smart contracts deployed onto the blockchain, actions related to the vehicle may be automated.

When a vehicle is involved in a vehicle loss, a node (i.e., the vehicle or sensors installed on or within the vehicle) generates and transmits a transaction associated with the vehicle's unique identifier to a blockchain network, which compiles the transaction into a block of the blockchain. Potential data included in the blockchain and/or each blockchain transaction, block, or update may include identity data (e.g., VIN number of the vehicle), vehicle sensor data (e.g., indicative of driving, braking, speed, cornering, stop/start, acceleration, theft of items inside the vehicle, collisions, etc.) collected from one or more sensors installed on or within the vehicle, supplemental data collected from other sources (e.g., mobile device sensor data, smart infrastructure sensor data, image data from cameras in the vicinity of an accident), a license plate number, state of issuance, operator information (e.g., social security number, name, contact information like address, phone, email address, etc.), insurance carrier information (e.g., insurer name, insurance policy ID or number; an indication of whether the policy remains in force, effective dates of the policy, expiration date of the insurance coverage; and/or insurance policy coverages, terms, limits, deductibles, conditions, etc.). Any of the data listed above, or a hash or encrypted version thereof, may serve as a key to access and/or update the blockchain for the vehicle. Each of the blockchain entities, or only a subset, may be validation entities that validate the transaction and any of the data contained in the transaction on the blockchain network.

A server, which can be any one of the entities described above that generated a particular smart contract, may subscribe to one or more transactions including data related to vehicle loss. Accordingly, the server may route the transactions to the particular smart contract so that the particular smart contract may determine that the data related to the vehicle loss indicates that a parametric event defined by the particular smart contract has occurred, and direct the server or other entity associated with the particular smart contract to perform one or more actions. In some embodiments, routing the transactions may include extracting identity data (e.g., VIN number) from the transactions and utilizing the identity data to query one or more smart contracts. The smart contract that matches the identity data may be considered to be the "particular smart contract." Accordingly, routing may further include the server inputting the transaction data described above into the particular smart contract. To this end, based upon the transaction data, the particular smart contract may then direct the performance of an action to enforce the particular smart contract.

As an example, a server (e.g., insurer) may generate a smart contract to perform an action (e.g., initiate an INOL on behalf of the driver of the vehicle), when a parametric event as defined in the smart contract occurs (e.g., the extent of damage to the vehicle exceeds a certain level). Thus, when the server receives a transaction including vehicle sensor data, the smart contract may automatically analyze the vehicle sensor data to determine whether the extent of vehicle damage as indicated in the vehicle sensor data exceeds the level (i.e., whether the parametric event occurred). Accordingly, the smart contract may direct the performance of an action to automatically initiate an INOL on behalf of the driver of the vehicle when the parametric event occurs based upon the vehicle sensor data.

As another example, a server (e.g., tow service company, taxi or ride share company, repair shop, body shop, first responders, etc.) may generate a smart contract to perform a certain action (e.g., provide services such as towing services, taxi or ride-share services, vehicle repair services, or medical assistance) on behalf of the driver of the vehicle, when a parametric event as defined in the smart contract occurs (e.g., the extent of damage to the vehicle exceeds a certain level and the location of the vehicle is within an operating range of the services).

In yet another example, a server (e.g., insurer) may generate one or more smart contracts, each to perform a certain action (e.g., coordinate with other entities to provide services such as towing services, taxi or ride-share services, vehicle repair services, medical assistance, etc.) on behalf of the driver of the vehicle, when a parametric event as defined in the smart contract occurs (e.g., the extent of damage to the vehicle exceeds a certain level and the location of the vehicle is within an operating range of the entity).

Thus, for each particular parametric event, a server may generate a respective smart contract for handling a specific action when a specific parametric event occurs. When the server receives a transaction including vehicle sensor data, the smart contract may automatically analyze the vehicle sensor data to determine whether the parametric event has occurred. Accordingly, the smart contract may direct the performance of an action to automatically provide a certain service on behalf of the driver of the vehicle based upon the vehicle sensor data.

The blockchain may be leveraged to record each generated smart contract, the vehicle sensor data included in transaction(s) provided by the vehicle, and/or other data related to the parametric events defined in the smart contracts. In one aspect, vehicle sensor data and/or other supplemental data (e.g., mobile device sensor data, smart infrastructure sensor data, image data from cameras in the vicinity of an accident) included in transaction(s) and utilized to determine the occurrence of parametric events to determine actions defined in smart contracts may be recorded on the blockchain. By recording this data in the blockchain, there is a public and trusted record of the transaction(s) and smart contracts, and the logic behind any actions performed as directed by the respective smart contracts.

As a result, the parties that generated the smart contracts may automatically enforce their smart contracts in a transparent and objective manner. For at least this reason, an entity that regularly generates smart contracts, such as an insurer, may establish a blockchain to govern and enforce or maintain one or more smart contracts. According to some embodiments, the blockchain may either be a public ledger (each node may readily view the underlying data of each transaction) or a private ledger (the underlying data needs an encryption key to be viewed), or a combination of public and private ledger embodiments.

According to some embodiments, sensors (e.g., original equipment manufacturer (OEM) sensors) installed on or within a vehicle, and in some cases, other sources such as an electronic device associated with each vehicle and smart infrastructure sensors may each execute an application to monitor vehicle sensor data that is relevant to the enforcement of a smart contract-such as vehicle operational data, vehicle telematics data, vehicle sensor data, vehicle condition data, mileage data, maintenance data, parts data, system data, system or software version data, mobile device data, GPS data, etc. For example, an application may process vehicle sensor data from an airbag sensor to determine a parametric event (e.g., that the vehicle was involved in a collision).

As another example, the application may process vehicle sensor data from a glass break sensor to determine another parametric event (e.g., that the windows of the vehicle were broken and theft of items included in the vehicle took place). The application may interpret the vehicle sensor data to generate a transaction that includes the vehicle sensor data or a portion thereof. In some embodiments, the transaction may be timestamped and/or include the location of the vehicle.

Exemplary Computer Environments

FIG. 1 depicts an exemplary computing environment 100 for creating and deploying smart contracts onto a blockchain, recording transactions to the blockchain, and performing actions based upon the execution of smart contracts on the blockchain. Although FIG. 1 depicts certain entities, components, and devices, it should be appreciated that additional or alternate entities and components are envisioned.

As illustrated in FIG. 1, the exemplary computing environment 100 may include a vehicle 104. The vehicle 104 may be a car, motorcycle, bike, or any other suitable vehicle. Additionally, the vehicle 104 may be a conventional vehicle, an autonomous vehicle, a smart vehicle, a connected vehicle, etc. The vehicle 104 may include one or more sensors that may generate vehicle sensor data of the vehicle 104, including telematics data of the vehicle 104, and/or that may indicate an operational status of the vehicle 104 (e.g., location, speed, idling time, harsh acceleration or braking, fuel consumption, vehicle faults, cornering, direction or heading, etc.). The sensors may include, for example, a pressure sensor, a gyroscope, an accelerometer, an odometer, a vibration sensor, a microphone, an image sensor, a temperature sensor, glass break sensors, a radar or LIDAR sensor, and/or other suitable sensors. In some embodiments, some of the sensors can be OEM sensors installed on or in the vehicle by a manufacturer of the vehicle, and in other embodiments, some of the sensors may be retrofitted onto the vehicle at some point after manufacture. In some embodiments, these sensors may be configured to wirelessly communicate vehicle sensor data generated by the sensors via a wireless interface (e.g., a Wi-Fi interface, a cellular interface, or other known wireless communication interfaces) to a server 115 via one or more communication networks 110 (e.g., via wireless communication or data transmission over one or more radio links or digital communication channels).

In some embodiments, the vehicle 104 may further include an electronic device configured to collect vehicle sensor data generated by the sensors. The electronic device may be a processing unit of the vehicle 104 interconnected to the sensors via a communication bus of the vehicle 104, or a user device 102 (e.g., a mobile phone, a tablet, a laptop computer, a smart watch, smart glasses, augmented reality glasses or headset, virtual reality glasses or headset, other types of wearable electronics, an on-board diagnostic monitor, and so on) associated with an operator of the vehicle 104. In these embodiments, the electronic device may receive, from the sensors, the vehicle sensor data via a wireless interface (e.g., a Bluetooth interface, a Wi-Fi interface, or other known wireless communication interfaces) or a wired interface (e.g., an OBD port, a USB interface, an auxiliary interface, or other known wired communication interfaces), and transmit the vehicle sensor data to the server 115 via one or more communication networks 110.

The server 115 may include a database 120 to store the vehicle sensor data generated by the sensors and collected from the vehicle 104. The server 115 may also include one or more processors configured to execute a sensor data analysis application that is programmed to analyze the vehicle sensor data stored in the database 120. More particularly, the sensor data analysis application may be configured to analyze the vehicle sensor data to detect or identify one or more parametric events, each of which corresponds to a certain vehicle loss. For example, the sensor data analysis application may analyze at least a portion of the vehicle sensor data (e.g., generated by glass break sensors adhered to the vehicle 104) that indicates that a broken window of the vehicle 104 correlates to a parametric event of theft of item(s) in the vehicle 104 (e.g., as confirmed by dashcam sensors located in the interior of the vehicle 104 that capture video data conveying items being stolen).

As another example, analysis of at least a portion of the vehicle sensor data (e.g., generated by sensors adhered to the front-side and back-side of body panels of the vehicle 104) may indicate that isolated damage of the vehicle 104 (e.g., the front but not the back) correlates to a parametric event of a relatively small collision (e.g., the vehicle 104 drove into trees, mailboxes, etc.), whereas extensive damage of the vehicle 104 (e.g., the front and back of the vehicle 104 severely damaged) correlates to a parametric event of a relatively large collision (e.g., the vehicle 104 suffered total loss beyond repair).

In some embodiments, the sensor data analysis application may analyze other data in addition to the vehicle sensor data to identify parametric events. For example, the sensor data analysis application may analyze supplemental data (e.g., image data showing that the vehicle 104 collided into a tree, or was involved in a more serious accident) originating from other sources (e.g., camera installed at a traffic light nearby the site of an accident) to identify or confirm identification of a parametric event.

After determining or identifying one or more parametric events based upon analysis of vehicle sensor data collected from vehicle 104, the one or more processors of the server 115 may execute a smart contract generator 116 (or alternatively, the same sensor data analysis application) to generate an executable smart contract for each of the identified parametric events. The generated smart contracts may be stored in database 130. Generally speaking, the smart contracts include executable code that defines a function for initiating INOL, personal assistance (e.g., calling the police, EMTs, etc.), and/or vehicle assistance (e.g., calling towing services, taxi or ride-share services, vehicle repair services, vehicle salvage services, and/or the like) in response to the occurrence of an underlying parametric event.

Having one or more smart contracts in place (e.g., stored in database 130), the server 115 is equipped to deploy the smart contracts onto the blockchain, and subsequently assess new vehicle sensor data from new the vehicle 104.

According to some embodiments, the vehicle 104 (e.g., by way of a computing device, such as one or more of sensors and/or electronic device) and/or the user device 102 may send an electronic transmission (i.e., a transaction) to the server 115 via the one or more communication networks 110. The transaction may include at least vehicle identity data (e.g., VIN number of the vehicle 104, serial number of any one or more of sensors and/or electronic device, username or number of an account associated with the operator of the vehicle 104) and vehicle sensor data (or at least a portion thereof) generated by sensors and/or electronic device on or within the vehicle 104. In some embodiments, the vehicle sensor data may include location information and time stamp information to indicate when and where vehicle loss occurred.

Upon receiving the transaction, the server 115 may route the transaction to one or more applicable smart contracts by extracting vehicle identity data from the transaction and utilizing the vehicle identity data to find only those smart contracts deployed on the blockchain where the corresponding identity data 140 accounts for the vehicle identity data. In turn, the one or more smart contracts that account for the vehicle identity data each execute to determine whether the vehicle sensor data or other data included in the transaction indicates a respective parametric event that would trigger a corresponding action.

In some embodiments, the transaction may include the ID of the parametric event, which may be detected by an application executing on the one or more of sensors and/or electronic device associated with the vehicle 104 based upon an analysis of the vehicle sensor data. In such embodiments, when the server 115 receives the transaction including the ID of the parametric event, the server 115 need only match the ID of the parametric event with ID of a smart contract to determine whether the transaction indicates the parametric event, thereby conserving processing of resources that would otherwise be needed to analyze the vehicle sensor data included in the transaction to determine whether the transaction indicates a parametric event. In some embodiments, the transaction may include supplemental data (e.g., provided by electronic device) that indicates additional information that may be relevant to the parametric event, such as third-party weather data, traffic data, image data, etc. As an example, a parametric event may be related to a weather condition at the time vehicle loss occurred (e.g., the presence of rain when vehicle loss occurred).

In some embodiments, the supplemental data may originate from another source (interchangeably referred herein as an "evidence oracle") that can provide supporting evidence of a parametric event, such as a weather application server, infrastructure smart sensors, traffic cameras, environmental conditions sensors, Internet of Things (IoT) devices, etc. Generally speaking, an evidence oracle is connected to the internet that records supplemental data occurring during the parametric event, and may transmit that supplemental data to the blockchain network where it may be used in various processes.

For example, an evidence oracle may collect supplemental data on a traffic intersection at which the parametric event took place. As illustrated in FIG. 1, such an evidence oracle may provide a transaction including the supplemental data (and a cryptographic hash of the supplemental data) to the server 115 via the one or more communication networks 110. In some embodiments, the transaction may include other data elements, such as transaction ID, unique identifier of the evidence oracle, a data type (e.g., video and audio data), etc. In the following description, any reference to transaction may also include transaction.

As illustrated in FIG. 1, the server 115 may include a blockchain manager 117. The blockchain manager 117 may be a software program, engine, and/or a module that is executed by one or more processors interconnected within the server 115 and configured to (i) compile one or more transactions (e.g., transactions) into blocks; (ii) update a blockchain to include the blocks; (iii) route the transactions to applicable smart contracts; and/or (iv) automatically execute the smart contracts if the transactions meet certain conditions defined by the smart contracts. In some embodiments, the blockchain manager 117 may (i) receive and compile transaction into a block; (ii) update blockchain 145 to include the block; (iii) route transaction (or data thereof) to a smart contract deployed onto the blockchain 145 that corresponds to a specific parametric event indicated by or otherwise associated with the transaction; and/or (iv) automatically execute the smart contract.

In certain embodiments, the blockchain manager 117 may identify the blockchain 145 to add new blocks to using the unique identifier of the vehicle 104, or otherwise use the unique identifier to access the blockchain 145 or update the blockchain 145. As described above, each of the smart contracts may include a listing of all vehicles (e.g., unique identifiers) that are applicable to the smart contract, and the blockchain manager 117 may identify which smart contract to route the transaction to using a unique identifier of the vehicle 104 as an access key. To this end, the blockchain manager 117 may extract the unique identifier from transaction and route the transaction to a respectively corresponding smart contract that governs the unique identifier.

In some embodiments, prior to updating the blockchain 145 with the block, the server 115 may transmit the block to one or more entities 135a-g via one or more communication networks 110 to generate a solution to incorporate the block into the blockchain 145, and/or to form a consensus on the solution. The one or more entities may include an insurer entity 135a, emergency response entity 135b, towing services entity 135c, vehicle repair services entity 135d, vehicle salvage entity 135e, a taxi or ride-share services entity 135f, and/or a vehicle rental services entity 135g to name a few. Other entities are contemplated, such as a vehicle manufacturer entity, a State Department of Motor Vehicles (DMV) entity, a vehicle dealership entity, a vehicle rental company entity, and other suitable entities that may generally relate to maintaining and/or servicing vehicles.

Although FIG. 1 illustrates the one more entities 135a-g as being separate from the server 115, it should be appreciated that the server 115 may itself include a module dedicated to generating a solution to the cryptographic puzzle and/or forming a consensus on the solution. The blockchain 145 may be maintained via a network of nodes, including the vehicle 104, server 115, and/or entities 135a-g. The nodes may have access to the blockchain 145, generate data included in the blockchain 145, and/or store local copies of the blockchain 145.

When the blockchain manager 117 identifies which particular smart contract to route the transaction to, the particular smart contract may direct the server 115 to perform an action defined by the particular smart contract to enforce the particular smart contract. For example, the action defined by a particular smart contract may be to initiate INOL with insurer entity 135a. The insurer entity 135a may use the vehicle sensor data or other data included in transaction to initiate the INOL.

As another example, the action defined by a particular smart contract may be to communicate with emergency response entity 135b to dispatch a first responder to a location of the vehicle involved in a vehicle collision. As yet another example, the action defined by a particular smart contract may be to communicate with a towing services entity 135c, a vehicle repair services entity 135d, a vehicle salvage entity 135e, a taxi or ride-share services entity 135f, and/or a vehicle rental services entity 135g to dispatch a tow truck to a location of the vehicle, schedule an appointment for fixing the vehicle, schedule an appointment to salvage the vehicle, dispatch a taxi or ride-share service to a location of the vehicle, and/or reserve a rental vehicle, respectively.

In some embodiments, any of the foregoing actions may be performed by the server 115 and/or the user device 102 via an application. For example, the execution of a particular smart contract (e.g., collision detection and/or collision determination) may cause an application on the user device 102 to initiate. Similarly, activity detected and/or inactivity detected in the application may cause transactions to be written to the blockchain, cause remote devices and/or systems to act (e.g., the server 115), and/or cause the user device 102 to act. For example, a collision determination on the blockchain may cause the application to initiate, and a lack of activity in the application may indicate the need for immediate emergency services, which in turn may cause the user device 102 and/or the server 115 to contact an emergency response entity 135b to dispatch emergency response services, such as an ambulance, to the location of the vehicle 104 and/or record the contact with the emergency response entity 135b to the blockchain.

According to some embodiments, an administrator of the server 115 may interact with a management interface 119 to control embodiments of the blockchain 145 and/or set control parameters associated with the blockchain manager 117. For example, a period for which blocks are generated may be set via the management interface 119. In some embodiments, the administrator of the server 115 may also interact with the management interface 119 to control embodiments of the smart contract generator 116, e.g., by editing, add, or deleting elements or parameters used by the smart contract generator 116 to generate smart contracts. Although FIG. 1 depicts the database 130 as a part of the server 115, the database 130 may be maintained within the blockchain 145.

The communication networks 110 may facilitate any data communication between/among the vehicle 104, entities 135a-g, and/or the server 115 via any standard or technology (e.g., GSM, CDMA, TDMA, WCDMA, LTE, EDGE, OFDM, GPRS, EV-DO, UWB, IEEE 802 including Ethernet, WiMAX, and/or others). According to some embodiments, the vehicle 104 and/or entities 135a-g may transmit generated transactions to the server 115 via the communication networks 110.

It should be appreciated that although the server 115 and entities 135a-g are shown as separate entities, in some embodiments, any one or more of the entities 135a-g may be, or otherwise include functionality of, the server 115. For example, the insurer entity 135a may include or be communicatively coupled to databases 120, 130, smart contract generator 116, blockchain manager 117, and management interface 119.

Although FIG. 1 illustrates a single server 115, a single vehicle 104, and several entities 135a-g, it should be appreciated that more or less servers, vehicles, and entities may be contemplated. In some embodiments, the server 115 may be one or more interconnected servers, for example, in a cloud computing environment. The exemplary computing environment 100 may include additional, fewer, or alternate equipment or components, including those discussed elsewhere herein.

Exemplary Components, Apparatuses, and Devices

Figure 2:
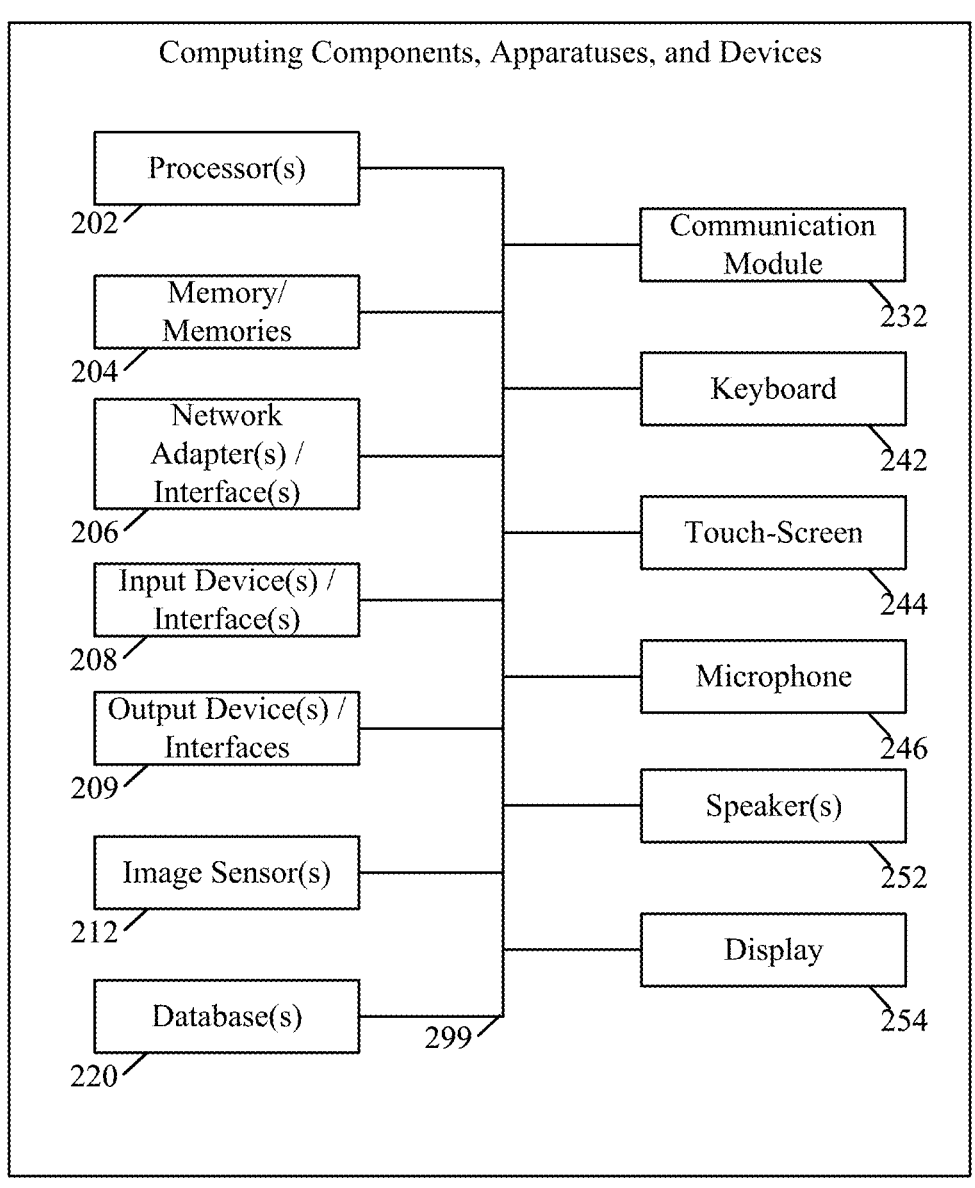
FIG. 2 depicts exemplary components, apparatuses, and devices used by devices and systems for implementing the techniques, systems, and methods disclosed herein.

FIG. 2 depicts a block diagram of exemplary components, apparatuses, and devices 200 to predict an efficacy value of an untested pharmaceutical for treating a malady.

The exemplary components, apparatuses, and devices 200 may include one or more processors 202 (e.g., a programmable processor, a programmable controller, a GPU, a DSP, an ASIC, a PLD, an FPGA, an FPLD, etc.), one or more memories (e.g., random access memory (RAM), read only memory (ROM), cache, etc.) 204, one or more network adapters and/or interfaces 206, one or more input devices and/or interfaces 208, one or more output devices and/or interfaces 209, one or more image sensors 212, one or more databases 220, a communication module 232, a keyboard 242, a touch-screen 244, a microphone 246, one or more speakers 252, and/or a display 254 all of which may be interconnected via an address/data bus 299. The one or more memories 204 may store software and/or computer-executable instructions, which may be executed by the one or more processors 202.

The one or more processors 202 may be, or may include, a central processing unit (CPU), a graphical processing unit (GPU), a digital signal processor (DSP), an application specific integrated circuit (ASIC), a programmable logic device (PLD), a field-programmable gate array (FPGA), a field-programmable logic device (FPLD), etc.

The one or more memories 204 may be, or may include, any local short term memory (e.g., random access memory (RAM), read only memory (ROM), cache, etc.) and/or any long term memory (e.g., hard disk drives (HDD), solid state drives (SSD), etc.).

The one or more network adapters and/or interfaces 206 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.).

The one or more input devices and/or interfaces 208 may be, or may include, any number of different types peripheral devices for inputting data. The peripheral devices for inputting data may be any desired type of device such as the keyboard 242, the touch-screen 244, a microphone 246, a navigation device (a mouse, a trackball, a capacitive touch pad, a joystick, etc.), a button, a communication interface, and/or the like. The one or more input devices and/or interfaces 208 may also include any number of different types of input units, circuits, and/or components that enable the one or more processors 202 to communicate with the peripheral devices for inputting data.

The one or more output devices and/or interfaces 209 may be, or may include, any number of different types peripheral devices for outputting results. The peripheral devices for outputting results may be any desired type of device such as one or more speakers 252, a display (a liquid crystal display (LCD), a cathode ray tube (CRT) display, touch, etc.) 254, a communication interface, an antenna, and/or the like. The one or more output devices and/or interfaces 209 may include any number of different types of output units, circuits, and/or components that enable the one or more processors 202 to communicate with the peripheral devices for outputting results.

The one or more databases 220 may be a server or some other form of data storage device (e.g., one or more memories 204, CDs, CD-ROMs, DVDs, Blu-ray disks, etc.).

The communication module 232 may be, or may include, computer-readable, executable instructions that may be stored in the one or more memories 204 and/or performed by the one or more processors 202. Further, the computer-readable, executable instructions of the communication module 232 may be stored on and/or performed by specifically designated hardware (e.g., micro controllers, microchips, etc.) which may have functionalities similar to the one or more memories 204 and/or the one or more processors 202.

Exemplary Graphic User Interfaces

Details of the aforementioned application may be implemented via one or more example graphical user interfaces (GUIs) 300*a-j* depicted in FIGS. 3A-3J that may be displayed on an electronic device (e.g., the user device 102). The one or more example GUIs 300*a-j* may be displayed upon execution of non-transitory computer-executable instructions stored at the electronic device. In some embodiments, the one or more example GUIs 300*a-j* may appear in succession upon opening the application.

In some embodiments, in the event of a collision being detected by the methods and systems described herein, a notification from an application server (e.g., the server 115) might be sent to the electronic device. The notification may be in the form of a text, email, a push notification from an application and/or the like. When the user follows a link from the notification and/or interacts with the notification, the electronic device may open the application and display the one or more example GUIs 300*a-j*.

Figure 3A:
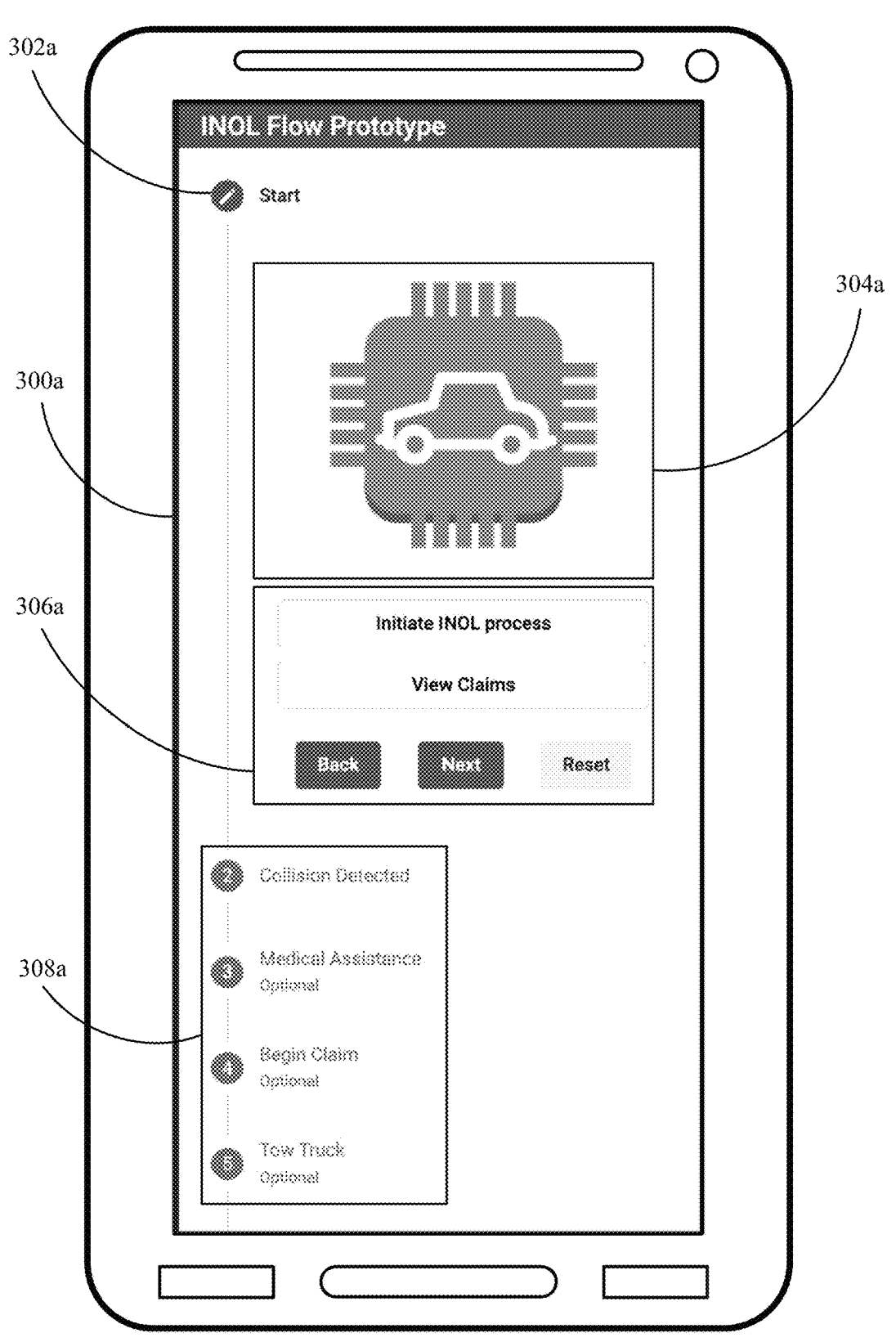
FIG. 3A depicts an exemplary application initiation GUI executing on a client computing device for implementing the techniques, systems, and methods disclosed herein.

FIG. 3A depicts an example of an application initiation GUI 300*a*, progress indicator elements 302*a*, 308*a* one or more text and/or image elements 304*a*, and one or more interactable elements 306*a*.

In some embodiments, the progress indicator elements 302*a*, 308*a* may be configured to cause the application to display a corresponding GUI upon selection. In other embodiments, the progress indicator elements 302*a*, 308*a* may not be interactable and may instead only indicate a current progress in the INOL process.

The one or more text and/or image elements 304*a* may include text and/or images. For example, FIG. 3A depicts an icon that may be associated with the application executing on the electronic device.

The one or more interactable elements 306*a* may include one or more interactable elements for the selection of data and/or entering of data by the user. For example, the one or more interactable elements 306*a* illustrated in FIG. 3A may include one or more selectable button elements enabling the user to initiate the INOL process (e.g., the pressable button element with the text "Initiate INOL process"), view any previously submitted, pending, and/or unsubmitted insurance claims (e.g., the pressable button element with the text "View Claims"), navigate to other GUIs (e.g., the pressable button element with the text "Back" or "Next"), and/or reset all of entered and/or selected data entered by the user thus far (e.g., the pressable button element with the text "Reset"). In some embodiments, the one or more selectable button elements may enable the user to initiate the INOL process by triggering the electronic device and/or the application server to begin the INOL process described herein upon user interaction.

Figure 3B:
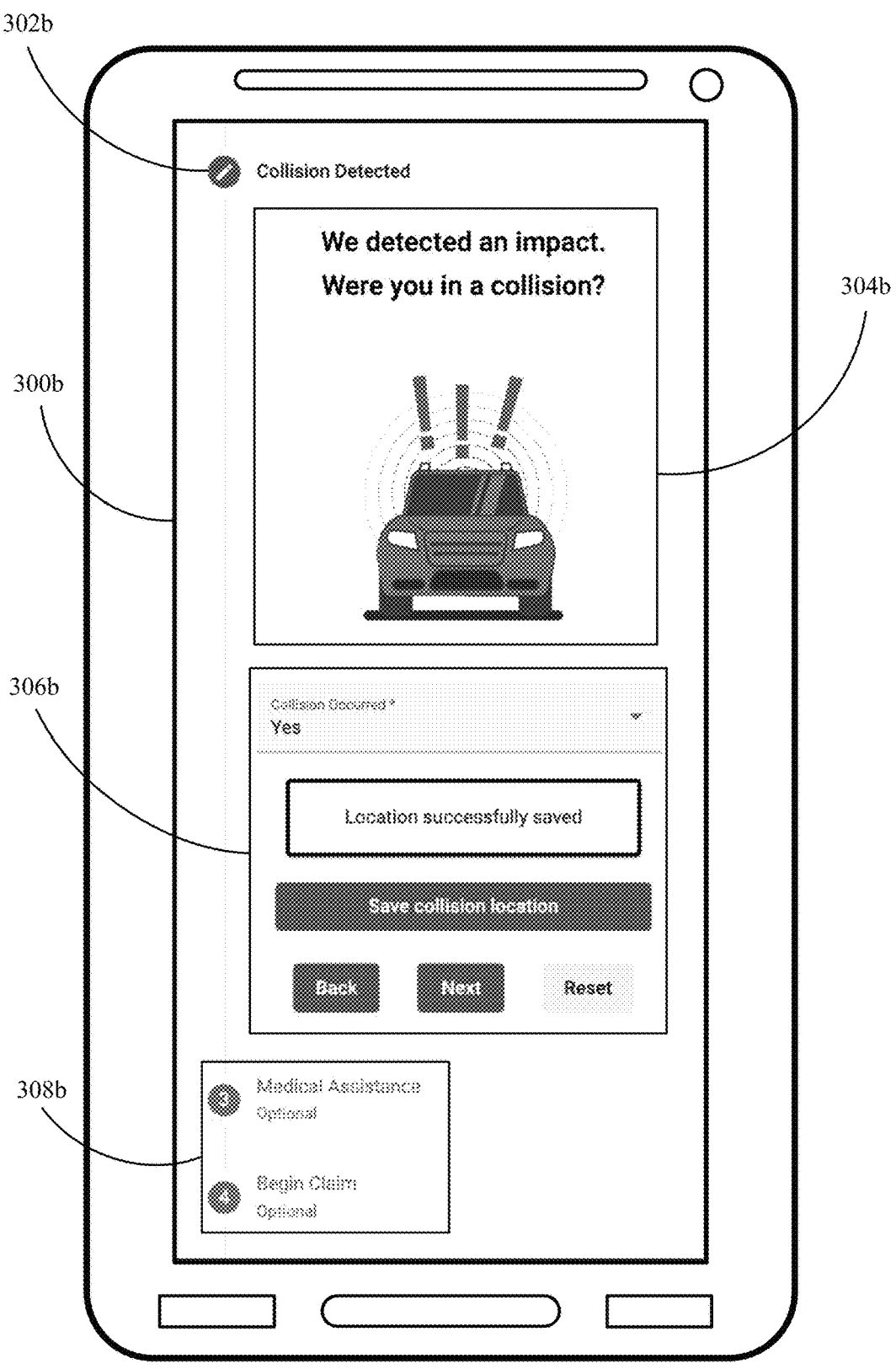
FIG. 3B depicts an exemplary collision detection GUI executing on a client computing device for implementing the techniques, systems, and methods disclosed herein.

FIG. 3B depicts an example collision detection GUI 300*b* whereby a user of the application may confirm that the vehicle 104 experienced a collision. The collision detection GUI 300*b* may include one or more progress indicator elements 302*b*, 308*b*, one or more text and/or image elements 304*b*, and/or one or more interactable elements 306*b*.

In some embodiments, the progress indicator elements 302*b*, 308*b* may be configured to cause the application to display a corresponding GUI upon selection. In other embodiments, the progress indicator elements 302*b*, 308*b* may not be interactable and may instead only indicate a current progress in the INOL process.

The one or more text and/or image elements 304*b* may include text and/or images. For example, FIG. 3B depicts the text "We detected an impact. Were you in a collision?" along with the image of a vehicle with radiating waves and three exclamation points.

The one or more interactable elements 306*b* may include one or more interactable elements for the selection of data and/or entering of data by the user. For example, the one or more interactable elements 306*b* may include one or more selection elements to indicate that a collision occurred (e.g., the drop down element with the text "Collision Occurred"), one or more pressable button elements that cause the electronic device to determine and/or store a current location of the vehicle 104 (e.g., the pressable button element with the text "Save collision location"), navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for indicating that a collision occurred cause the electronic device to store the user's selection until the user transmits the selection to the application server.

Figure 3C:
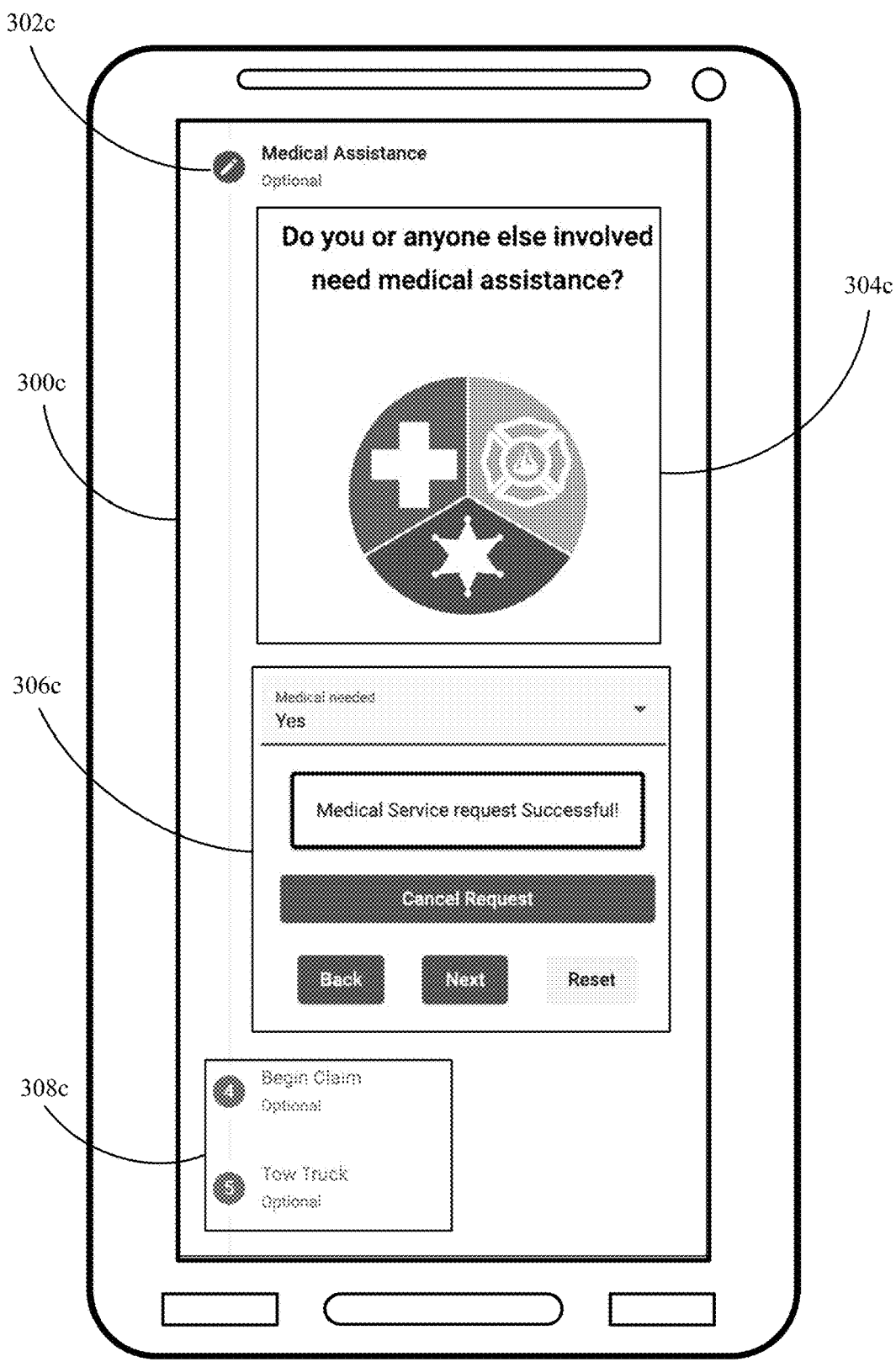
FIG. 3C depicts an exemplary emergency response contact GUI executing on a client computing device for implementing the techniques, systems, and methods disclosed herein.

FIG. 3C depicts an example an emergency response contact GUI 300*c* whereby a user of the application may request for emergency response services from an emergency response entity. The emergency response contact GUI 300*c* may include progress indicator elements 302*c*, 308*c* one or more text and/or image elements 304*c*, and/or one or more interactable elements 306*c*.

In some embodiments, the progress indicator elements 302*c*, 308*c* may be configured to cause the application to display a corresponding GUI upon selection. In other embodiments, the progress indicator elements 302*c*, 308*c* may not be interactable and may instead only indicate a current progress in the INOL process.

The one or more text and/or image elements 304*c* may include text and/or images. For example, FIG. 3C depicts the text "Do you or anyone else involved need medical assistance" along with a circle split into thirds with a first third depicting a cross to represent medical services, a second third depicting a fire badge to represent firefighting services, and a final third depicting a police star to represent police services.

The one or more interactable elements 306*c* may include one or more interactable elements of the GUI for the selection of data and/or entering of data by the user. For example, the one or more interactable elements 306*c* may include one or more selection elements to request emergency response services (e.g., the drop down element with the text "Medical needed" and the options of "Yes" and/or "No"), one or more pressable button elements allowing the user to cancel the request for emergency response services (e.g., the pressable button element with the text "Cancel Request"), navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for requesting emergency response services may cause the electronic device to store the user's selection until the user transmits the selection to the application server. In response, the application server may contact an emergency response entity on the user's behalf. Additionally or alternatively, the electronic device and/or the application server may contact the emergency response entity in response to the user interacting with the one or more selection elements for requesting emergency response services. In some embodiments, the request for emergency response services may include the current location of the vehicle 104.

Figure 3D:
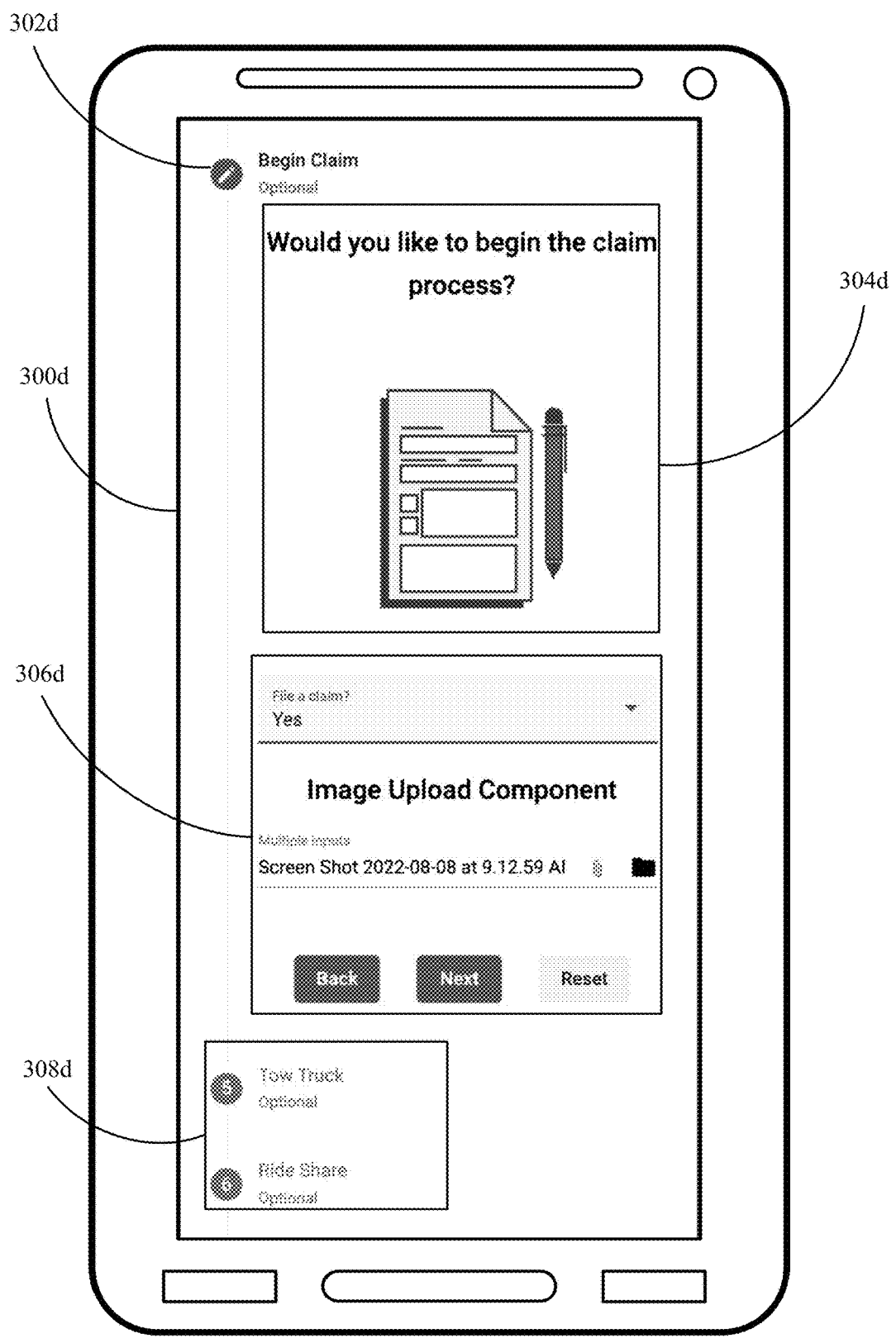
FIG. 3D depicts an exemplary notice of loss initiation GUI executing on a client computing device for implementing the techniques, systems, and methods disclosed herein.

FIG. 3D depicts a notice of loss initiation GUI 300*d* whereby a user of the application may initiate a notice of loss of the vehicle 104 with an insurer entity. The notice of loss initiation GUI 300*d* may include progress indicator elements 302*d*, 308*d*, one or more text and/or image elements 304*d*, and/or one or more interactable elements 306*d*.

In some embodiments, the progress indicator elements 302*d*, 308*d* may be configured to cause the application to display a corresponding GUI upon selection. In other embodiments, the progress indicator elements 302*d*, 308*d* may not be interactable and may instead only indicate a current progress in the INOL process.

The one or more text and/or image elements 304*d* may include text and/or images. For example, FIG. 3D depicts the text "Would you like to begin the claim process?" along with an icon of a blank form and a pen.

The one or more interactable elements 306*d* may include one or more interactable elements of the GUI for the selection of data and/or entering of data by the user. For example, the one or more interactable elements 306*d* may include one or more selection elements to initiate the filing of an insurance claim (e.g., the drop down element with the text "File a claim?" and the options of "Yes" and/or "No"), one or more interactable icons for the sharing of electronic data files (e.g., the folder and/or paperclip icons next to an electronic data file stored on the electronic device), and/or one or more pressable button elements allowing the user to navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for initiating the filing of an insurance claim may cause the electronic device to store the user's selection until the user transmits the selection to the application server. In response, the application server may initiate the filing of an insurance claim on the user's behalf. Additionally or alternatively, the electronic device and/or the application server may initiate the filing of an insurance claim in response to the user interacting with the one or more selection elements for initiating the filing of an insurance claim.

In some embodiments, the one or more interactable icons for the sharing of electronic data files cause the electronic device to access the electronic device's memory, thereby allowing the user to select one or more electronic data files for upload to the application server. Additionally or alternatively, in some embodiments, the one or more interactable icons for the sharing of electronic data files may cause the electronic device to launch a camera or other imaging device to capture and/or store images and/or other electronic data files to be uploaded to the application server.

Figure 3E:
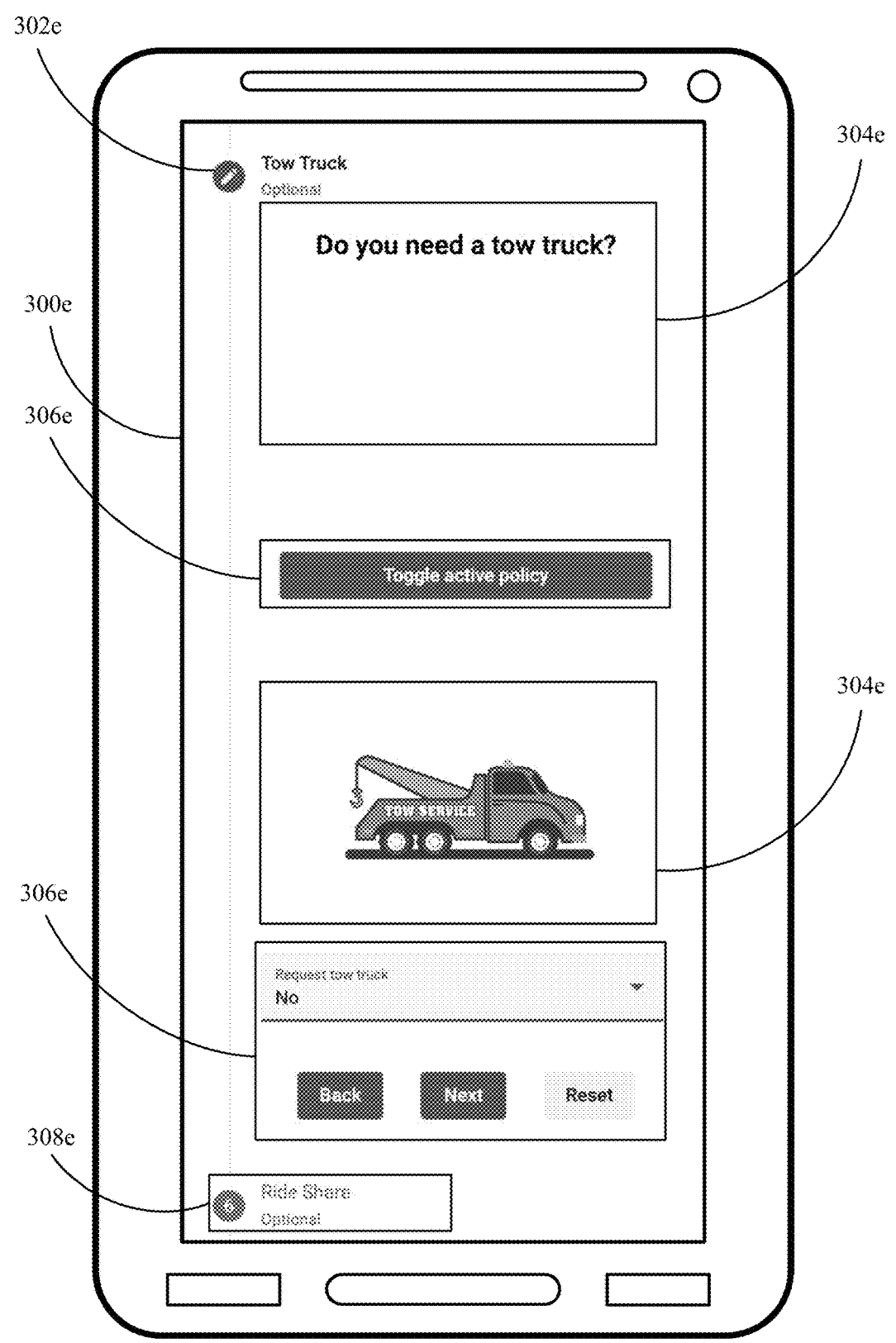
FIG. 3E depicts an exemplary towing service contact GUI executing on a client computing device for implementing the techniques, systems, and methods disclosed herein.

FIG. 3E depicts a towing service contact GUI 300e whereby a user of the application may request for towing services with a towing service entity. The towing service contact GUI 300e may include progress indicator elements 302e, 308e, one or more text and/or image elements 304e, and/or one or more interactable elements 306e.

In some embodiments, the progress indicator elements 302e, 308e may be configured to cause the application to display a corresponding GUI upon selection. In other embodiments, the progress indicator elements 302e, 308e may not be interactable and may instead only indicate a current progress in the INOL process.

The one or more text and/or image elements 304e may include text and/or images. For example, FIG. 3E depicts the text "Do you need a tow truck?" along with an image of a tow truck.

The one or more interactable elements 306e may include one or more interactable elements of the GUI for the selection of data and/or entering of data by the user. For example, the one or more interactable elements 306e may include one or more selection elements to request towing services (e.g., the drop down element with the text "Request tow truck" and the options of "Yes" and/or "No") and/or one or more pressable button elements allowing the user to view the active insurance policy and/or toggle between insurance policies (e.g., the pressable button element with the text "Toggle active policy"), navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for requesting towing services may cause the electronic device to store the user's selection until the user transmits the selection to the application server. In response, the application server may contact a towing service entity on the user's behalf. Additionally or alternatively, the electronic device and/or the application server may contact the towing service entity in response to the user interacting with the one or more selection elements to request towing services. In some embodiments, the request for towing services may include the current location of the vehicle 104.

In some embodiments, the one or more pressable button elements allowing the user to view the active insurance policy and/or toggle between insurance policies may allow the user to view and/or change the active insurance policy to the current insurance claim. Depending on the active insurance policy, the one or more example GUIs 300a-j may be excluded from the application. For example, if a user's active insurance policy does not allow cover towing services, the towing service contact GUI 300e may be excluded from the one or more example GUIs 300a-j displayed on the electronic device. Similarly, in the event the user has multiple insurance policies, and the user changes a currently active insurance policy that does not cover towing services to an insurance policy that does cover towing services, the towing service contact GUI 300e may be added to the one or more example GUIs 300a-j displayed on the electronic device.

Figure 3F:
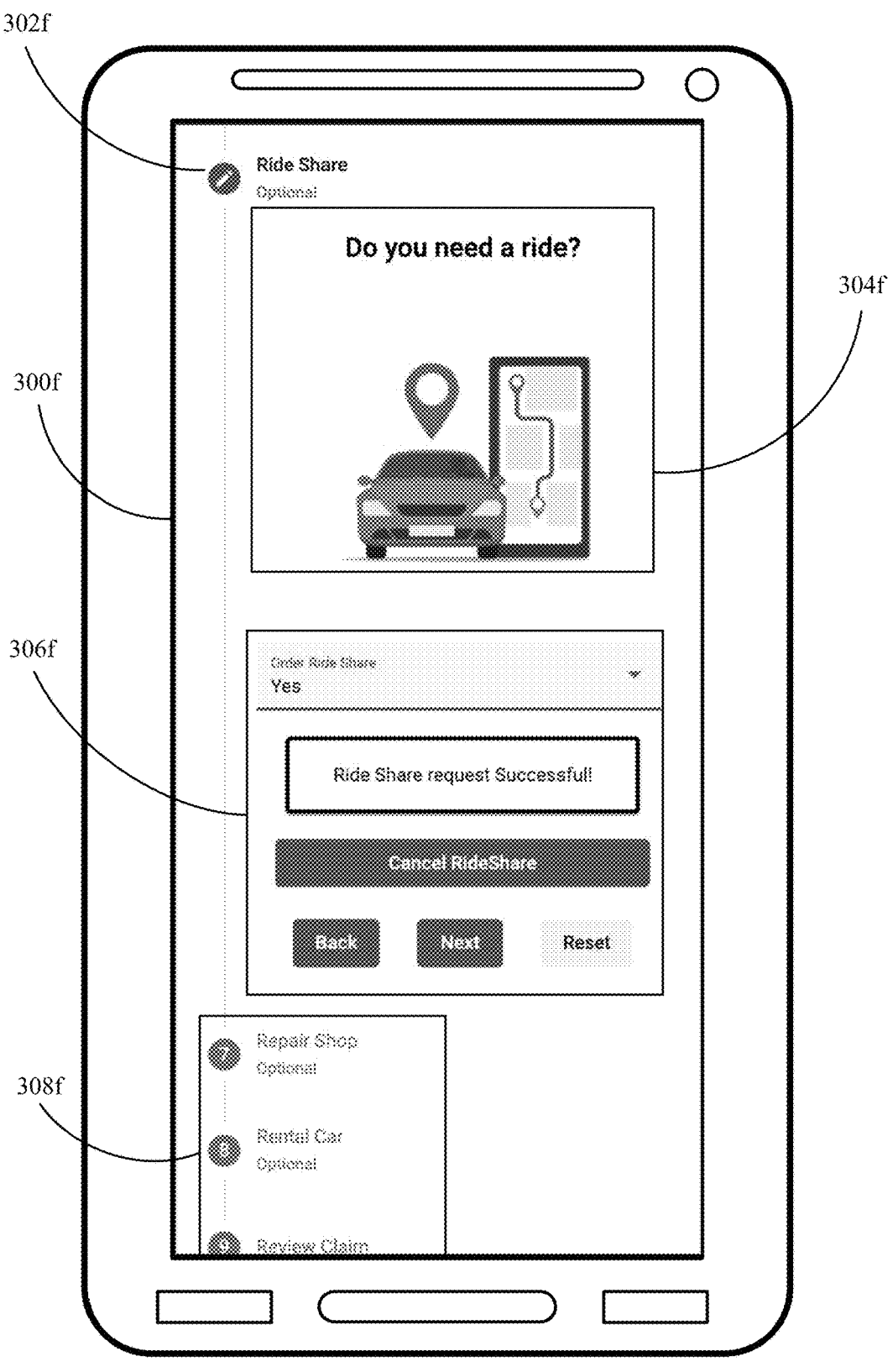
FIG. 3F depicts an exemplary taxi and/or ride-share contact GUI executing on a client computing device for implementing the techniques, systems, and methods disclosed herein.

FIG. 3F depicts a taxi and/or ride-share contact GUI 300f whereby a user of the application may request for a taxi and/or a ride-share from a taxi entity and/or ride-share entity. The taxi and/or ride-share contact GUI 300f may include progress indicator elements 302f, 308f, one or more text and/or image elements 304f, and/or one or more interactable elements 306f.

In some embodiments, the progress indicator elements 302f, 308f may be configured to cause the application to display a corresponding GUI upon selection. In other embodiments, the progress indicator elements 302f, 308f may not be interactable and may instead only indicate a current progress in the INOL process.

The one or more text and/or image elements 304f may include text and/or images. For example, FIG. 3F depicts the text "Do you need a ride?" along with an image of a vehicle with a GPS pin also featuring a map application on a smart device.

The one or more interactable elements 306f may include one or more interactable elements of the GUI for the selection of data and/or entering of data by the user. For example, the one or more interactable elements 306f may include one or more selection elements to request a taxi and/or a ride share (e.g., the drop down element with the text "Order Ride Share" and the options of "Yes" and/or "No") and/or one or more pressable button elements allowing the user to cancel the requested taxi and/or ride share (e.g., the pressable button element with the text "Cancel RideShare"), navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for requesting a taxi and/or a ride share may cause the electronic device to store the user's selection until the user transmits the selection to the application server. In response, the application server may contact a taxi or ride-share service entity on the user's behalf. Additionally or alternatively, the electronic device and/or the application server may contact the taxi or ride-share service entity in response to the user interacting with the one or more selection elements to request a taxi and/or a ride share. In some embodiments, the request for a taxi and/or ride share may include the current location of the vehicle 104.

Figure 3G:
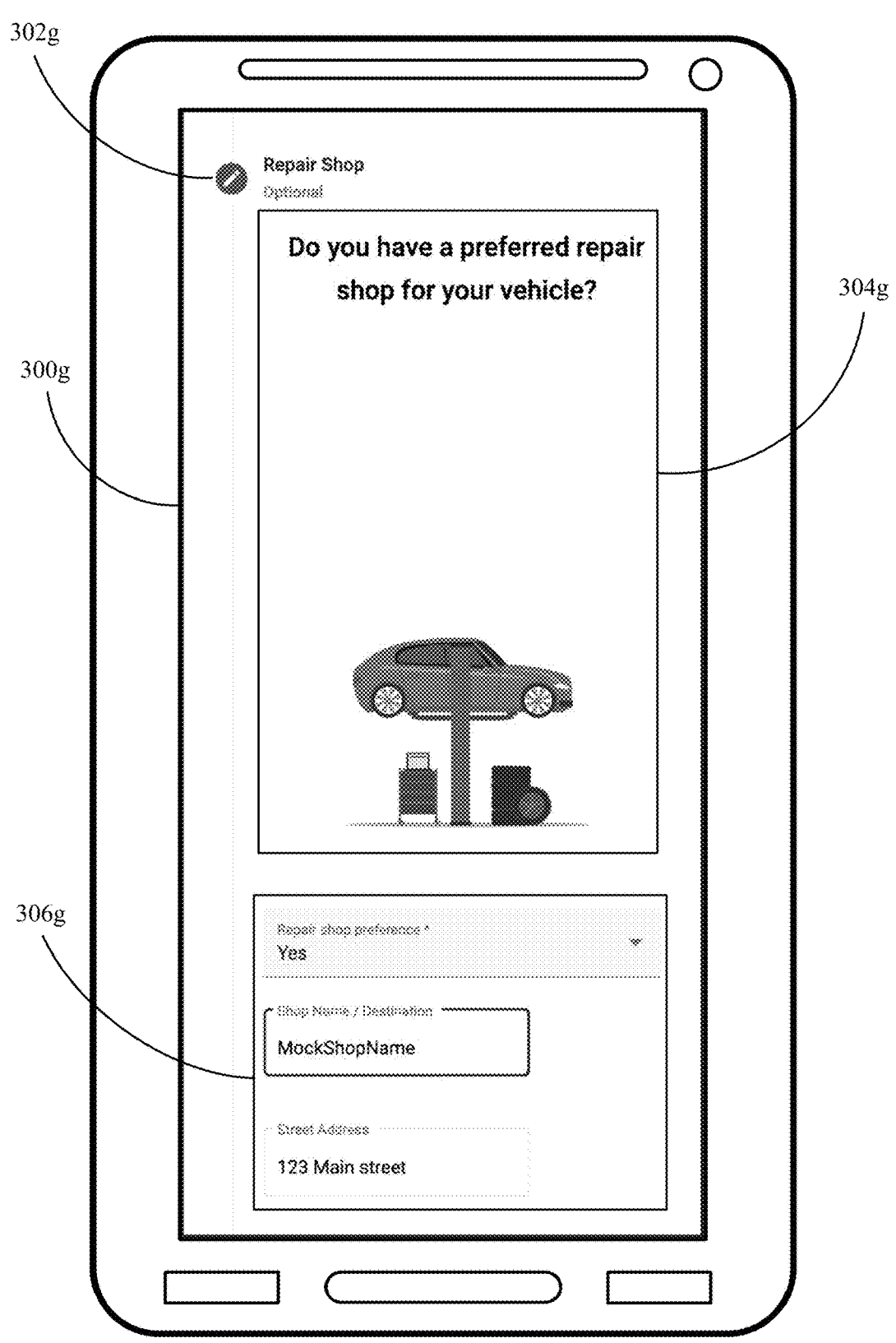
FIG. 3G depicts an exemplary repair shop and/or body shop contact GUI executing on a client computing device for implementing the techniques, systems, and methods disclosed herein.

FIG. 3G depicts a repair shop and/or body shop contact GUI 300g whereby a user of the application may request for repair services of the vehicle 104 from a vehicle repair service entity. The repair shop and/or body shop contact GUI 300g may include progress indicator elements 302g, one or more text and/or image elements 304g, and/or one or more interactable elements 306g.

In some embodiments, the progress indicator elements 302g may be configured to cause the application to display a corresponding GUI upon selection. In other embodiments, the progress indicator elements 302g may not be interactable and may instead only indicate a current progress in the INOL process.

The one or more text and/or image elements 304g may include text and/or images. For example, FIG. 3G depicts the text "Do you have a preferred repair shop for your vehicle?" along with an image of a vehicle on a vehicle lift.

The one or more interactable elements 306g may include one or more interactable elements of the GUI for the selection of data and/or entering of data by the user. For example, the one or more interactable elements 306g may include one or more selection elements to indicate a preference of a body and/or repair shop (e.g., the drop down element with the text "Repair shop preference" and the options of "Yes" and/or "No") and/or one or more text entry elements allowing the user to enter data relating to a preferred body and/or repair shop (e.g., the text entry elements with the text "Shop Name/Destination", the text entry elements with the text "Street Address", etc.). In some embodiments, the one or more selection elements for indicating a preference of a body and/or repair shop may cause the electronic device to store the user's selection and/or entries until the user transmits the selection to the application server. In response, the application server may contact a vehicle repair service entity of the user's preference (if the user selected a "Yes" drop down element) and/or a vehicle repair service entity of the insurer entity's preference (if the user selected a "No" drop down element) on the user's behalf. Additionally or alternatively, the electronic device and/or the application server may contact a vehicle repair service entity of the user's preference (if the user selected a "Yes" drop down element) and/or a vehicle repair service entity of the insurer entity's preference (if the user selected a "No" drop down element) in response to the user interacting with the one or more selection elements to indicate a preference of a body and/or repair shop.

In some embodiments, the one or more interactable elements 306g may also include one or more interactable elements not shown in FIG. 3G. For example, the one or more interactable elements 306g may also include one or more pressable button elements allowing the user to navigate to other GUIs (e.g., a pressable button element with the text "Back" or "Next"), and/or reset all of entered and/or selected data entered by the user thus far (e.g., a pressable button element with the text "Reset"). As another example, the one or more interactable elements 306g may also include an interactable element to allow the user to indicate to not bring the vehicle 104 to any vehicle repair service entity (e.g., a drop down element with the text "Contact a repair shop on your behalf?" and the options of "Yes" and/or "No"). As yet another example, the one or more interactable elements 306g may also include an interactable calendar that allows the user to schedule service of the vehicle 104.

In some embodiments, the one or more pressable button elements allowing the user to view the active insurance policy and/or toggle between insurance policies described above may also allow the user to alter portions of the one or more example GUIs 300a-j. For example, an active insurance policy may not allow a user to designate a preferred body and/or repair shop. In this example, the repair shop and/or body shop contact GUI 300g may have portions of the GUI excluded (e.g., the repair shop and/or body shop contact GUI 300g will no longer ask the user for a body and/or repair shop reference and/or enter in the name and/or address of a preferred body and/or repair shop) but other portions of the repair shop and/or body shop contact GUI 300g may still remain (e.g., a user may be able to schedule when to have the vehicle serviced via an interactive calendar element).

Figure 3H:
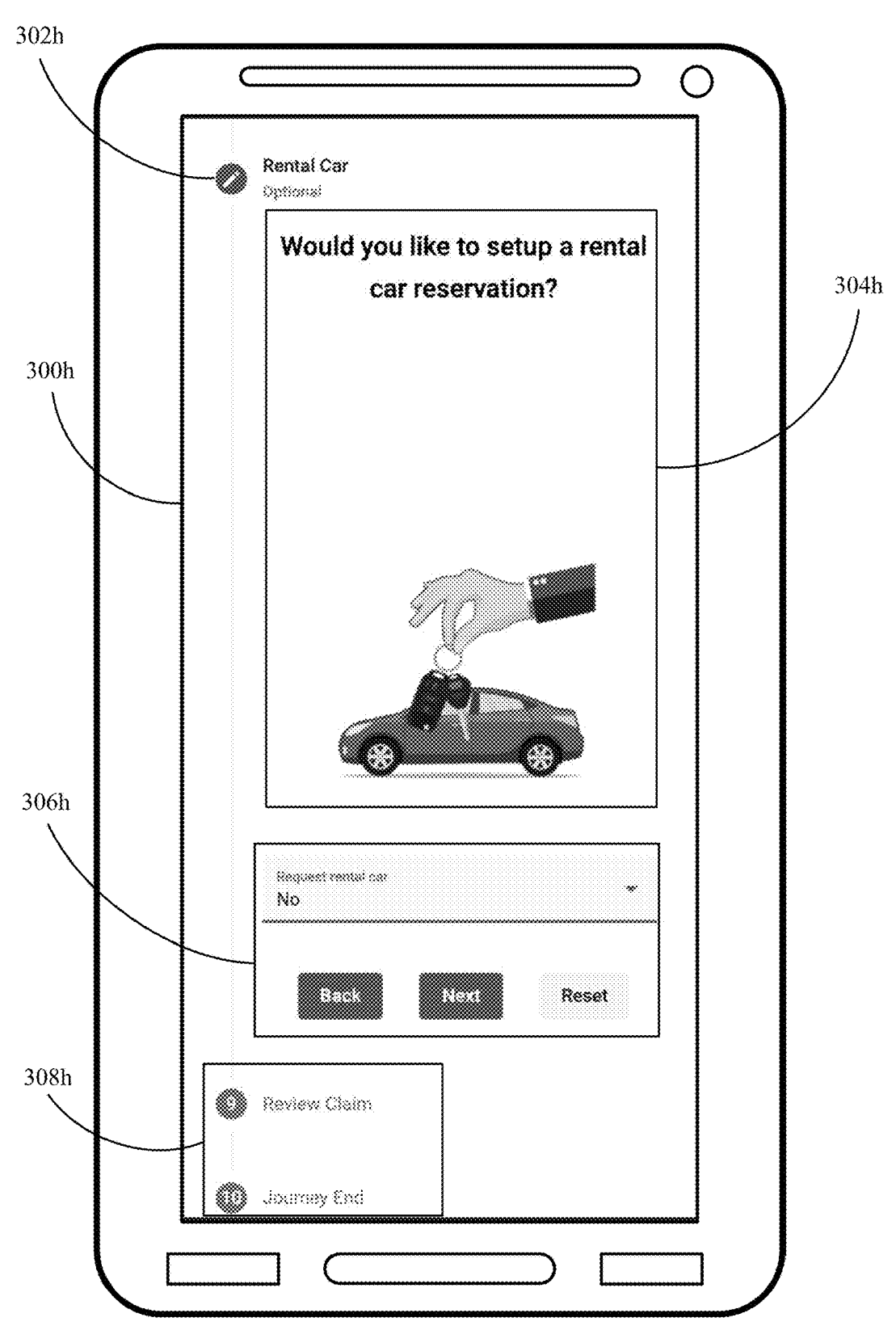
FIG. 3H depicts an exemplary rental vehicle contact GUI executing on a client computing device for implementing the techniques, systems, and methods disclosed herein.

FIG. 3H depicts a rental vehicle contact GUI 300h whereby a user of the application may request for a vehicle rental from a vehicle rental service entity. The rental vehicle contact GUI 300h may include progress indicator elements 302h, 308h, one or more text and/or image elements 304h, and/or one or more interactable elements 306h.

In some embodiments, the progress indicator elements 302h, 308h may be configured to cause the application to display a corresponding GUI upon selection. In other embodiments, the progress indicator elements 302h, 308h may not be interactable and may instead only indicate a current progress in the INOL process.

The one or more text and/or image elements 304h may include text and/or images. For example, FIG. 3H depicts the text "Would you like to setup a rental car reservation?" along with an image of a vehicle overlayed by an outstretched hand dangling vehicle keys.

The one or more interactable elements 306h may include one or more interactable elements of the GUI for the selection of data and/or entering of data by the user. For example, the one or more interactable elements 306h may include one or more selection elements to reserve a rental vehicle (e.g., the drop down element with the text "Request rental car" and the options of "Yes" and/or "No") and/or one or more pressable button elements allowing the user to navigate to other GUIs (e.g., the pressable button element with the text "Back" or "Next"), and/or reset all of entered and/or selected data entered by the user thus far (e.g., the pressable button element with the text "Reset"). In some embodiments, the one or more selection elements for reserving a rental vehicle may cause the electronic device to store the user's selection until the user transmits the selection to the application server. In response, the application server may contact a vehicle rental service entity to reserve a rental vehicle on the user's behalf. Additionally or alternatively, the electronic device and/or the application server may contact the vehicle rental service entity in response to the user interacting with the one or more selection elements to reserve a rental vehicle. In some embodiments, certain selections of the one or more interactable elements 306g may cause additional one or more interactable elements not shown in FIG. 3G to be displayed on the electronic device. For example, selecting "Yes" to the drop down element may cause additional drop down elements to be displayed allowing the user to indicate preference of vehicle to rent.

Figure 3I:
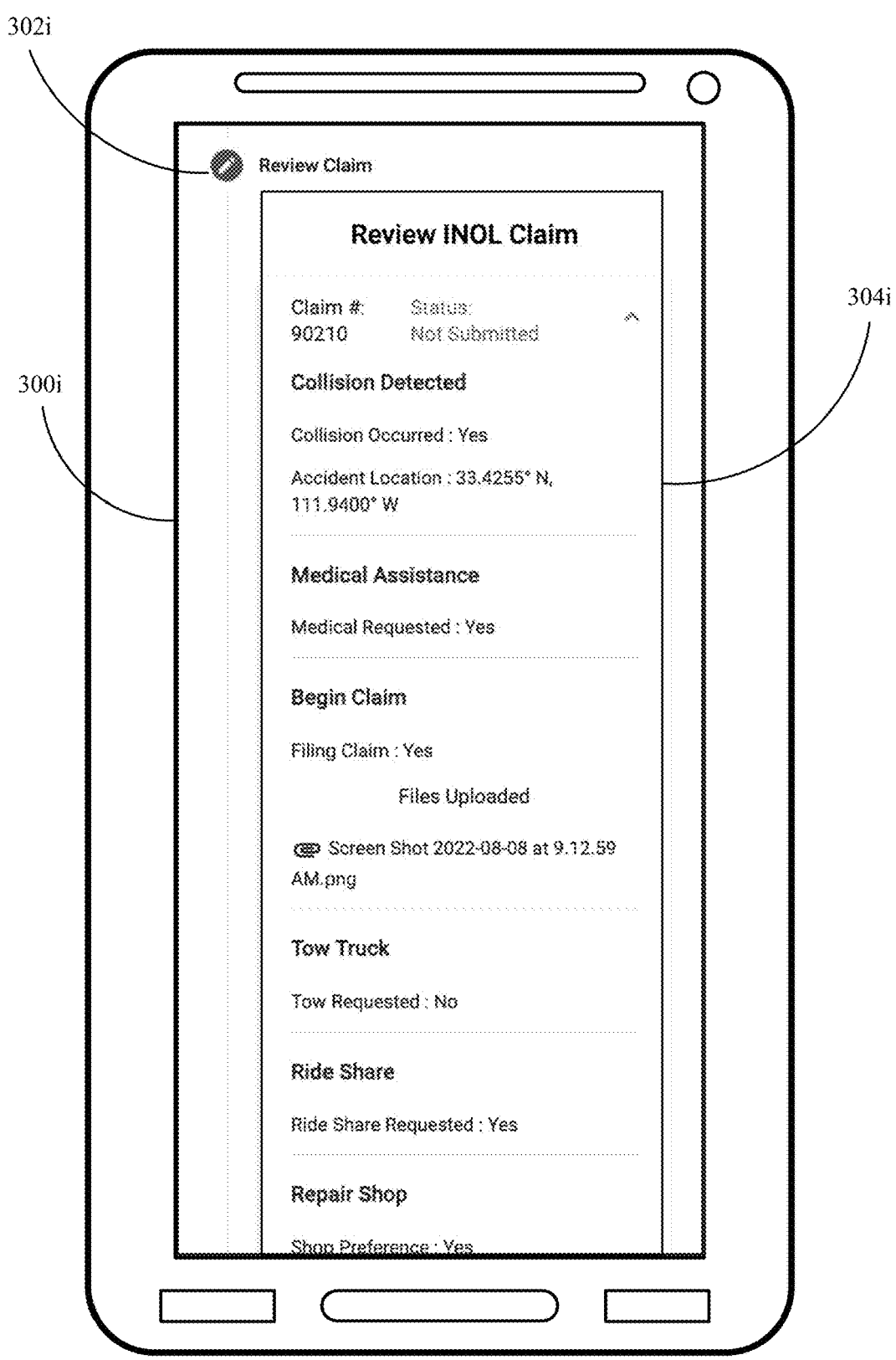
FIG. 3I depicts an exemplary data entry and/or data selection review GUI executing on a client computing device for implementing the techniques, systems, and methods disclosed herein.

FIG. 3I depicts a data entry and/or data selection review GUI 300i whereby a user of the application may review the data they entered and/or the data they selected and/or edit their data entries and/or selections and/or return to prior GUIs to make edits to their data entries and/or selections. The data entry and/or data selection review GUI 300i may include progress indicator elements 302i and/or one or more text and/or image elements 304i.

In some embodiments, the progress indicator elements 302i may be configured to cause the application to display a corresponding GUI upon selection. In other embodiments, the progress indicator elements 302i may not be interactable and may instead only indicate a current progress in the INOL process.

The one or more text and/or image elements 304i may include text and/or images. For example, FIG. 3I depicts the text "Review INOL Claim", the text "Collision Occurred", the user selected data of "Yes", the text "Medical Requested", the user selected data of "Yes", the text of "Filing Claim", the user selected data of "Yes", the text "Tow Requested", the user selected data of "No", the text of "Ride Share Requested", the user selected data of "Yes", the text of "Shop Preference", and the user selected text of "Yes".

Figure 3J:
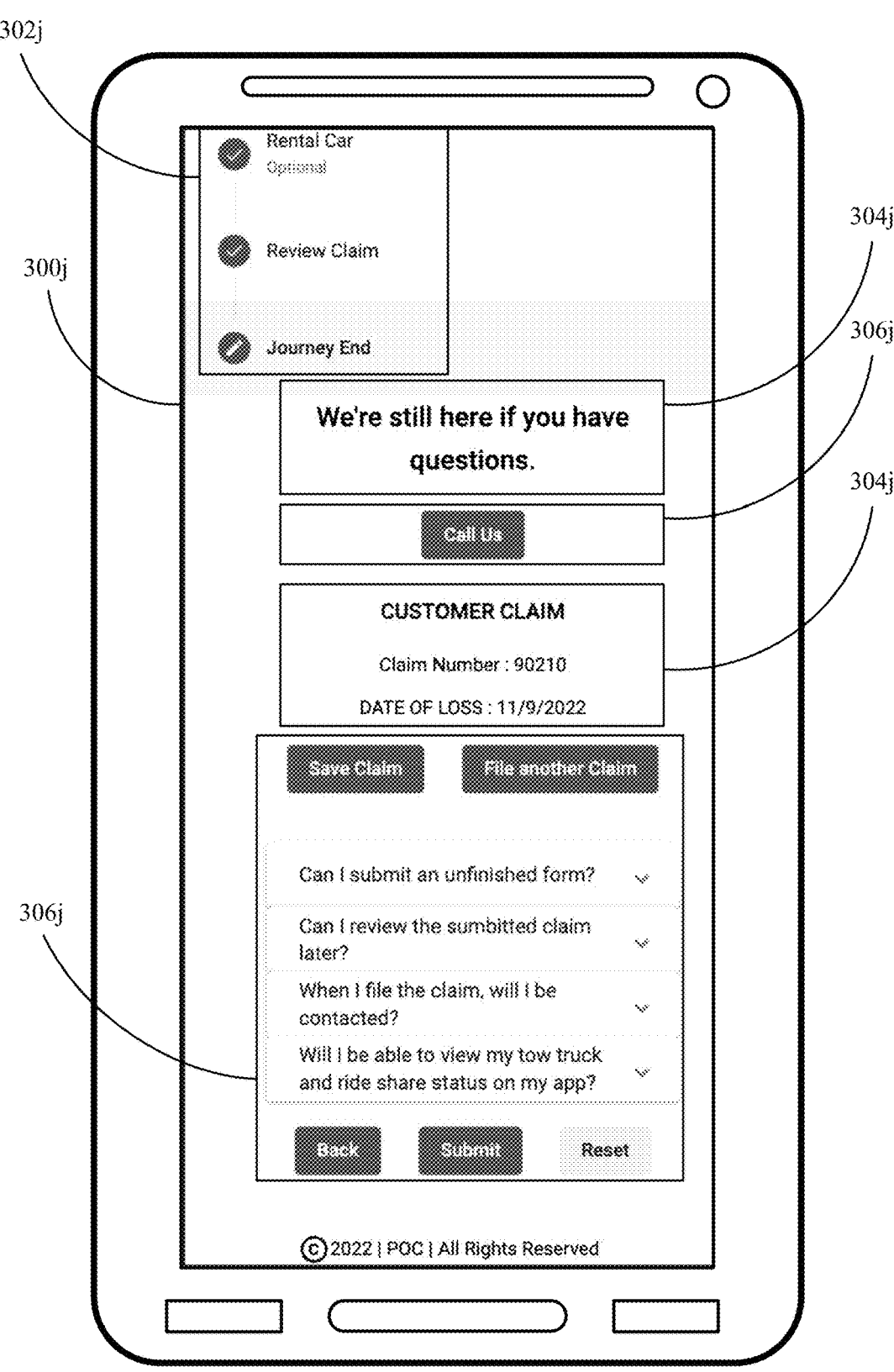
FIG. 3J depicts an exemplary data submission GUI executing on a client computing device for implementing the techniques, systems, and methods disclosed herein.

FIG. 3J depicts a data submission GUI 300j whereby a user may submit their data entries and/or data submissions and/or cause the electronic device to act in accordance with the data entries and/or data selections and/or transmit the data entries and/or data selections to the application server to cause the application server to act in accordance with the data entries and/or data selections. The data submission GUI 300j may include progress indicator elements 302j, 308j, one or more text and/or image elements 304j, and/or one or more interactable elements 306j.

In some embodiments, the progress indicator elements 302j, 308j may be configured to cause the application to display a corresponding GUI upon selection. In other embodiments, the progress indicator elements 302h, 308h may not be interactable and may instead only indicate a current progress in the INOL process.

The one or more text and/or image elements 304*j* may include text and/or images. For example, FIG. 3J depicts the text "We're still here if you have questions." along with the text "Customer Claim", the text "Claim Number" next to the generated text of "90210" indicating the insurance claim number of the generated claim and the text "Date of Loss" next to the date "11/9/2022" indicating the date the user generated the claim.

The one or more interactable elements 306*j* may include one or more interactable elements of the GUI for the selection of data and/or entering of data by the user. For example, the one or more interactable elements 306*j* may include one or more interactable drop down elements (e.g., text related to frequently asked questions such as "Can I submit an unfinished form?" along with a downward facing arrow that will display answers to the corresponding frequently asked question once the text and/or arrow are interacted with by the user) and/or one or more pressable button elements allowing the user to save and store the current insurance claim generated including the data selected and/or entered thus far by the user (e.g., the pressable button element with the text "Save Claim"), initiate another insurance claim (e.g., the pressable button element with the text "File another claim"), submit the current insurance claim (e.g., the pressable button element with the text "Submit"), navigate to other GUIs (e.g., the pressable button element with the text "Back" or "Next"), and/or reset all of entered and/or selected data entered by the user thus far (e.g., the pressable button element with the text "Reset").

In some embodiments, interaction with the pressable button element to initiate another insurance claim may cause the data selected and/or entered by the user to be reset as another insurance claim is generated under a new reference number. In this embodiment, the user may be able to switch between insurance claims (so long as the user saved the current and/or previous insurance claims with the pressable button element to save and store the current and/or past insurance claims) using another interactable elements to switch between insurance claims (e.g., a drop down element with the text "Select a Saved Insurance Claim" and the options of the reference number of each saved insurance claim). Additionally or alternatively, interaction with the pressable button element to submit the current insurance claim may cause the data selected and/or entered to be made as immutable and/or data selected and/or entered to be transmitted to the application server. In some embodiments, the user may not be able to edit and/or otherwise interact with the current insurance claim once the user interacts with the pressable button element to submit the current insurance claim.

Once a user interacts with the pressable button element to submit the current insurance claim, the electronic device may execute any of the related systems and/or methods described herein. For example, if the user selected "Yes" from the interactable drop down element from the collision detection GUI 300*b*, a token may be sent to the application server indicating that the vehicle 104 has been in a collision. Additionally, any of the foregoing actions to be performed based upon the selections and/or entries made by the user may be performed by the electronic device or the application server. For example, if the user selected "Yes" from the interactable drop down element from the emergency response contact GUI 300*c*, a token may be sent by the electronic device to the application server to direct the application server to contact the emergency response entity and/or the electronic device may contact the emergency response entity directly. Additionally or alternatively, in some embodiments, the foregoing actions to be performed by the electronic device and/or the application server may be performed immediately once the user interacts with the corresponding interactive element. For example, if the user selected "Yes" from the interactable drop down element from the emergency response contact GUI 300*c*, the electronic device may immediately contact an emergency response entity.

The one or more example GUIs 300*a-j* are not limited to the aforementioned and/or illustrated exemplary embodiments. For example, the one or more example GUIs 300*a-j* are depicted as formatted for an electronic device in the form of a mobile phone; however, other exemplary GUIs may be designed for other devices (e.g., vehicle consoles, etc.). Additionally, the layout of the one or more example GUIs 300*a-j* may include more or less detail, different language, various placement of interactive elements, different ordering, and/or the like. Further, the one or more example GUIs 300*a-j* described herein are not exhaustive, nor should their inclusion be interpreted as a necessary or unnecessary function of the techniques, methods, and systems disclosed herein.

Exemplary Implementation of the Graphic User Interfaces

Figure 4:
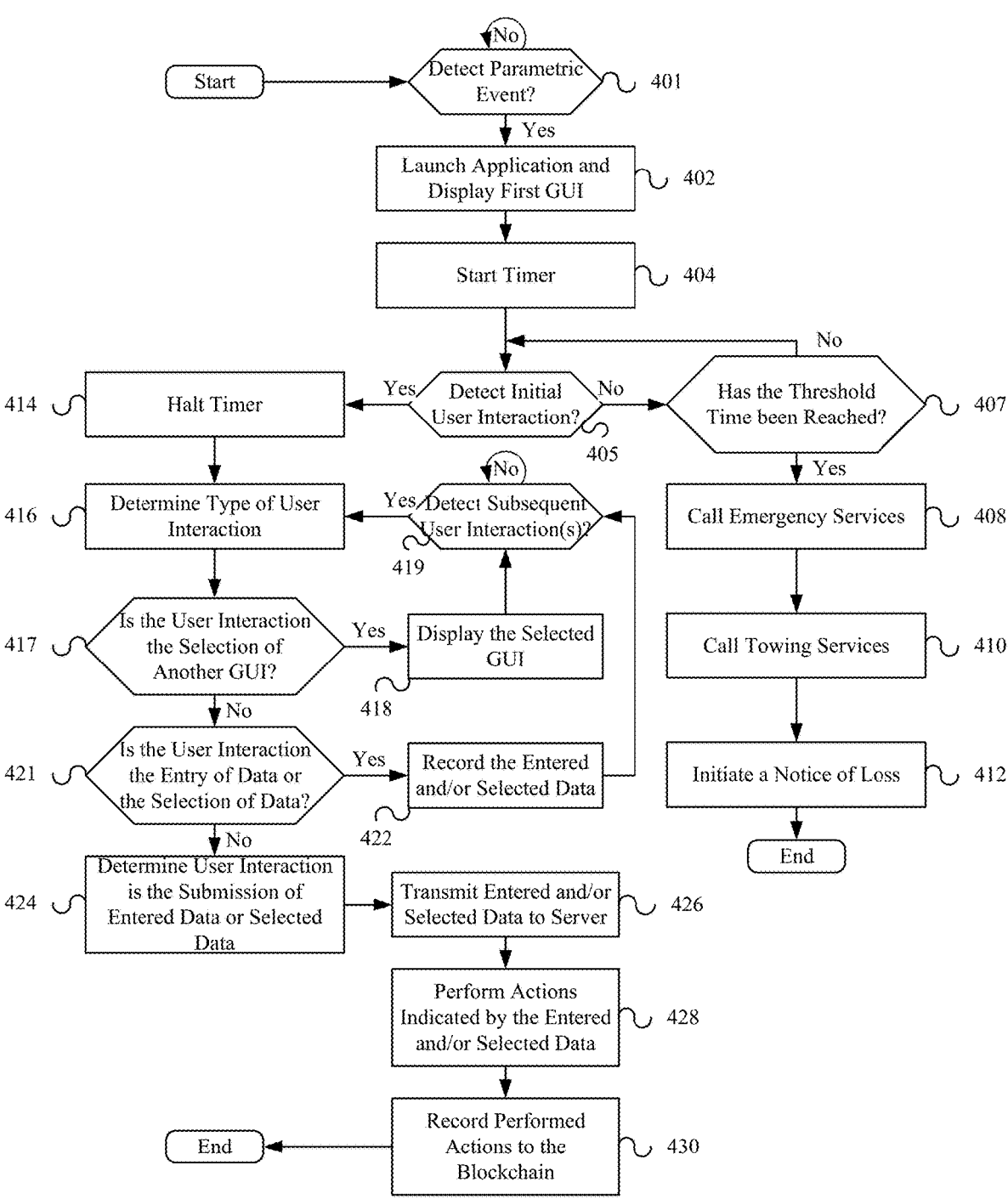
FIG. 4 depicts an exemplary flowchart representative of example methods, hardware logic and instructions for implementing the techniques, systems, and methods disclosed herein.

FIG. 4 depicts an exemplary computer-based method 400 for implementing the graphic user interfaces. In some aspects, the method 400 may correspond to, and/or be implemented by, the user device 102 of FIG. 1.

The processes, methods, software, and/or computer-executable instructions included within the method 400 may be, or may include, an executable program or portion of an executable program for execution by a processor such as the one or more processors 202 of FIG. 2. The program may be embodied in software or instructions stored on a non-transitory computer-readable storage medium or disk associated with the processor. Further, although the example program is described with reference to the flowchart illustrated in FIG. 4, many other methods of implementing the graphic user interfaces may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or firmware.

The method 400 of FIG. 4 may begin when a device (e.g., user device 102) waits to a detect a parametric event (block 401). If the device has not detected a parametric event (block 401), the method 400 may continue waiting at block 401. When the device does detect a parametric event (block 401), the device may then launch the application and display a first GUI on a display of the device (block 402). The device may also start a timer that counts time until a predetermined threshold time (block 404).

The device may determine whether the device has detected an initial user interaction with the application (block 405). If the device has not detected an initial user interaction with the application (block 405), the device may determine whether the timer has reached the threshold time (block 407). If the timer has not reached the threshold time, the device may return to block 405. If the timer has reached the threshold time, the device may call an emergency response entity (block 408), call a towing service entity (block 410), and/or initiate a notice of loss (block 412).

If the device has detected an initial user interaction with the application (block 405), the device may halt the timer (block 414). The device may then determine the type of the user interaction (block 416). The device may then determine whether the user interaction is the selection of another GUI (block 417). If the user interaction is the selection of another GUI (block 417), the device may display the GUI selected by the user (block 418). The device may determine whether the device has detected a subsequent user interaction with the application (block 419). If the device has not detected a subsequent user interaction with the application (block 419), the device may continue waiting at block 419. If the device has detected a subsequent user interaction with the application (block 419), the device may determine the type of user interaction of the subsequent user interaction (block 416).

If the user interaction is not the selection of another GUI (block 417), the t device may determine whether the user interaction is the entry of data and/or the selection of data (block 421). If the user interaction is the entry of data and/or the selection of data (block 421), the device may record the entered and/or selected data by the user (block 422). The device may determine whether the device has detected a subsequent user interaction with the application (block 419).

If the user interaction is the entry of data and/or the selection of data (block 421), the device may determine that the user interaction is the submission of all recorded entered and/or selected data (block 424). The device may transmit the recorded entered and/or selected data to a server (e.g., the server 115) (block 426). The device may perform any of the actions indicated by the recorded entered and/or selected data (block 428). The device may record the performed actions to the blockchain (block 430).

Exemplary Method

FIG. 5 depicts an exemplary computer-implemented method 500 for providing a graphic user interface (GUI). The method 500 depicted in FIG. 5 may employ any of the techniques, methods, and/or systems described above with respect to FIGS. 1-4 and may produce any of the exemplary graphic user interfaces (GUIs) depicted in FIGS. 3A-J.

The method 500 may begin (block 502) by receiving, by one or more processors (e.g., 202) of a client computing device of a user (e.g., user device 102), an indication of a parametric event involving a vehicle (e.g., 104), wherein the indication is received in response to data related to the parametric event being recorded to a blockchain. In some embodiments, the parametric event data may be generated from an analysis of the vehicle sensor data, wherein the parametric event data is related to a parametric event. In some embodiments, a parametric event may be any one of theft involving a vehicle (corresponding to a "low" severity of loss), a collision involving the vehicle (corresponding to a "medium" severity of loss), or total loss of the vehicle (corresponding to a "high" severity of loss). However, generally speaking, a parametric event may relate to vehicle damage, and/or the extent or type of vehicle damage. In some embodiments, the one or more processors may receive supplemental data generated from one or more sources (e.g., smart infrastructure sensor, an electronic device located in the vehicle, a camera located in an area in which the vehicle is located, or a third-party server, such as a weather server) and analyze the supplemental data to determine the one or more parametric events. In some embodiments, the smart contract is configured to (i) receive a transaction from a computing device and (ii) automatically execute on the blockchain when the transaction indicates that a parametric event corresponding to the smart contract has occurred. In some embodiments, the transaction may include vehicle sensor data generated from sensors mounted on or within a vehicle.

The method 500 may proceed (block 504) by providing, via a display of the client computing device upon receiving the indication, a series of component graphic user interfaces, wherein the component graphic user interfaces are configured to facilitate one or more actions, the one or more actions including one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity. In some embodiments, the one or more actions may include additional and/or alternative actions, including those discussed elsewhere herein.

The method 500 may proceed (block 506) by detecting, via the component graphic user interfaces, one or more user interactions, the one or more user interactions including one or more selections of the one or more actions.

The method 500 may proceed (block 508) by performing, by the one or more processors of the client computing device, the one or more actions based upon the one or more user interactions.

The method 500 may proceed (block 508) by recording, by the one or more processors of the client computing device, a transaction indicating that the one or more actions has been performed to the blockchain.

The method 500 may include additional, less, or alternate actions, including those discussed elsewhere herein.

Additional Exemplary Embodiments

In one aspect, a computer based method for providing a graphic user interface may be provided. The method may be implemented via one or more local and/or remote processors, transceivers, sensors, servers, memory units, mobile devices, wearables, smart glasses, augmented reality glasses, virtual reality headsets, and/or other electronic and/or electrical components. In one instance, the method may include: (1) receiving, by one or more processors of a client computing device of a user, an indication of a parametric event involving a vehicle, wherein the indication may be received in response to data related to the parametric event being recorded to a blockchain; (2) providing, via a display of the client computing device upon receiving the indication, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detecting, via the component graphic user interfaces, one or more user interactions, the one or more user interactions may include one or more selections of the one or more actions; (4) performing, by the one or more processors of the client computing device, the one or more actions based upon the one or more user interactions; and/or (5) recording, by the one or more processors of the client computing device, a transaction indicating that the one or more actions has been performed to the blockchain. The method may include additional, less, or alternate actions, including those discussed elsewhere herein.

Additionally or alternatively to the foregoing method, performing the one or more actions may further include: associating, by the one or more processors of the client computing device, a particular component graphic user interface with a timer that measures an amount of time that has elapsed since providing the particular component graphic user interface; detecting, by the one or more processors of the client computing device, that the timer reached a threshold amount of time without detecting a user interaction with the particular component graphic user interface, wherein the timer halts upon detecting a user interaction with any of the particular component graphic user interface; in response to detecting that the timer reached the threshold amount of time, performing, by the one or more processors of the client computing device, one or more of: (i) initiating a notice of loss, (ii) communicating with an emergency response entity, and/or (iii) communicating with a towing service entity; in response to detecting a user interaction with a particular component graphic user interfaces, determining, by the one or more processors of the client computing device, a location of the vehicle; transmitting, by the one or more processors of the client computing device, an electronic communication that includes the location of the vehicle to one or more servers associated with: (i) the insurer entity, (ii) the emergency response entity, (iii) the towing service entity, (iv) the taxi or ride-share service entity, (v) the vehicle repair service entity, (vi) the vehicle salvage entity, and/or (vii) the vehicle rental service entity; transmitting, to one or more servers of the insurer entity, a query to identify one or more insurance policies associated with the user, the query being formatted in accordance with an application programming interface (API) of the insurance entity; receiving, from the one or more servers of the insurer entity, a response indicating at least one identified insurance policy; transmitting, to the one or more servers of the insurer entity, a query to determine whether the at least one insurance policy includes a policy feature, the query being formatted in accordance with the API; receiving, from the one or more servers of the insurer entity, a response indicating whether the policy feature is associated with the insurance policy; based upon the response, configuring, by the one or more processors of the client computing device, the series of component graphic user interfaces; determining, by the one or more processors of the client computing device, that the response indicates that the policy feature is not associated with the insurance policy; excluding, by the one or more processors of the client computing device, a particular component graphic user interface that relates to providing the policy feature from the series of component graphic user interfaces; and/or excluding, by the one or more processors of the client computing device, the policy feature from being included in an interactive element included in a particular component graphic user interface.

Additionally or alternatively to the foregoing method, the response indicating whether the policy feature is associated with the insurance policy may indicate two or more insurance policies. Additionally or alternatively to the foregoing method, the parametric event may include one or more of: (i) theft involving the vehicle, (ii) a collision involving the vehicle, and/or (iii) total loss of the vehicle. Additionally or alternatively to the foregoing method, transmitting the query to determine whether the at least one insurance policy includes the policy feature may further include: configuring, by the one or more processors of the client computing device, a particular component graphical user interface to include a selection element configured to enable the user to select between the two or more insurance policies; and/or transmitting, to the one or more servers of the insurer entity, a query to determine whether the selected insurance policy includes the policy feature. Additionally or alternatively to the foregoing method, receiving the indication of the parametric event involving the vehicle may include: receiving, by the one or more processors of the client computing device, vehicle sensor data generated from sensors mounted on or within the vehicle; and/or comparing, by the one or more processors of the client computing device, the vehicle sensor data to parametric event data stored on a smart contract deployed on the blockchain, wherein: (i) the parametric event data was generated from an analysis of the vehicle sensor data and/or (ii) the smart contract was configured to (a) receive a transaction from a computing device and/or (b) automatically execute on the blockchain when the transaction indicated that a parametric event corresponding to the smart contract has occurred.

In another aspect, a computer system for providing a graphic user interface may be provided. The computer system may be configured to include one or more local and/or remote processors, transceivers, sensors, servers, memory units, mobile devices, wearables, smart glasses, augmented reality glasses, virtual reality headsets, and/or other electronic and/or electrical components. In one instance, the computer system may include one or more processors; and/or a non-transitory program memory coupled to the one or more processors and/or storing executable instructions that, when executed by the one or more processors, cause the computer system to: (1) receive an indication of a parametric event involving a vehicle, wherein the indication may be received in response to data related to the parametric event being recorded to a blockchain; (2) provide, via a display of the client computing device, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detect, via the component graphic user interfaces, one or more user interactions, the one or more user interactions may include one or more selections of the one or more actions; (4) perform the one or more actions based upon the one or more user interactions; and/or (5) record a transaction indicating that the one or more actions has been performed to the blockchain. The computer system may be configured to include additional, less, or alternate functionality, including that discussed elsewhere herein.

Additionally or alternatively to the foregoing computer system, performing the one or more actions may further cause the computer system to: associate a particular component graphic user interface with a timer that measures an amount of time that has elapsed since providing the particular component graphic user interface; detect that the timer reached a threshold amount of time without detecting a user interaction with the particular component graphic user interface, wherein the timer halts upon detecting a user interaction with any of the particular component graphic user interface; in response to detecting that the timer reached the threshold amount of time, perform one or more of: (i)

initiating a notice of loss, (ii) communicating with an emergency response entity, and/or (iii) communicating with a towing service entity; in response to detecting a user interaction with a particular component graphic user interfaces, determine a location of the vehicle; transmit an electronic communication that includes the location of the vehicle to one or more servers associated with: (i) the insurer entity, (ii) the emergency response entity, (iii) the towing service entity, (iv) the taxi or ride-share service entity, (v) the vehicle repair service entity, (vi) the vehicle salvage entity, and/or (vii) the vehicle rental service entity; transmitting, to one or more servers of the insurer entity, a query to identify one or more insurance policies associated with the user, the query being formatted in accordance with an application programming interface (API) of the insurance entity; receive, from the one or more servers of the insurer entity, a response indicating at least one identified insurance policy; transmit, to the one or more servers of the insurer entity, a query to determine whether the at least one insurance policy includes a policy feature, the query being formatted in accordance with the API; receive, from the one or more servers of the insurer entity, a response indicating whether the policy feature is associated with the insurance policy; based upon the response, configure the series of component graphic user interfaces; determine that the response indicates that the policy feature is not associated with the insurance policy; exclude a particular component graphic user interface that relates to providing the policy feature from the series of component graphic user interfaces; and/or exclude the policy feature from being included in an interactive element included in a particular component graphic user interface.

Additionally or alternatively to the foregoing computer system, the response indicating whether the policy feature is associated with the insurance policy may indicate two or more insurance policies. Additionally or alternatively to the foregoing computer system, the parametric event may include one or more of: (i) theft involving the vehicle, (ii) a collision involving the vehicle, and/or (iii) total loss of the vehicle. Additionally or alternatively to the foregoing computer system, transmitting the query to determine whether the at least one insurance policy includes the policy feature may further cause the computer system to: configure a particular component graphical user interface to include a selection element configured to enable the user to select between the two or more insurance policies; and/or transmit, to the one or more servers of the insurer entity, a query to determine whether the selected insurance policy includes the policy feature. Additionally or alternatively to the foregoing computer system, receiving the indication of the parametric event involving the vehicle may further cause the computer system to: receive vehicle sensor data generated from sensors mounted on or within the vehicle; and/or compare the vehicle sensor data to parametric event data stored on a smart contract deployed on the blockchain, wherein: (i) the parametric event data was generated from an analysis of the vehicle sensor data and/or (ii) the smart contract was configured to (a) receive a transaction from a computing device and/or (b) automatically execute on the blockchain when the transaction indicated that a parametric event corresponding to the smart contract has occurred.

In another aspect, a tangible, a non-transitory computer-readable medium may store executable instructions for providing a graphic user interface may be provided. The executable instructions, when executed, may cause one or more processors to: (1) receive an indication of a parametric event involving a vehicle, wherein the indication may be received in response to data related to the parametric event being recorded to a blockchain; (2) provide, via a display of the client computing device, a series of component graphic user interfaces, wherein the component graphic user interfaces may be configured to facilitate one or more actions, the one or more actions may include one or more of: (i) initiating a claim filing, (ii) communicating with an insurer entity, (iii) communicating with an emergency response entity, (iv) communicating with a towing service entity, (v) communicating with a taxi or ride-share service entity, (vi) communicating with a vehicle repair service entity, (vii) communicating with a vehicle salvage entity, and/or (viii) communicating with a vehicle rental service entity; (3) detect, via the component graphic user interfaces, one or more user interactions, the one or more user interactions may include one or more selections of the one or more actions; (4) perform the one or more actions based upon the one or more user interactions; and/or (5) record a transaction indicating that the one or more actions has been performed to the blockchain. The instructions may direct additional, less, or alternate functionality, including that discussed elsewhere herein.

Additionally or alternatively to the foregoing executable instructions, performing the one or more actions may further cause the computer system to: associate a particular component graphic user interface with a timer that measures an amount of time that has elapsed since providing the particular component graphic user interface; detect that the timer reached a threshold amount of time without detecting a user interaction with the particular component graphic user interface, wherein the timer halts upon detecting a user interaction with any of the particular component graphic user interface; in response to detecting that the timer reached the threshold amount of time, perform one or more of: (i) initiating a notice of loss, (ii) communicating with an emergency response entity, and/or (iii) communicating with a towing service entity; in response to detecting a user interaction with a particular component graphic user interfaces, determine a location of the vehicle; transmit an electronic communication that includes the location of the vehicle to one or more servers associated with: (i) the insurer entity, (ii) the emergency response entity, (iii) the towing service entity, (iv) the taxi or ride-share service entity, (v) the vehicle repair service entity, (vi) the vehicle salvage entity, and/or (vii) the vehicle rental service entity; transmitting, to one or more servers of the insurer entity, a query to identify one or more insurance policies associated with the user, the query being formatted in accordance with an application programming interface (API) of the insurance entity; receive, from the one or more servers of the insurer entity, a response indicating at least one identified insurance policy; transmit, to the one or more servers of the insurer entity, a query to determine whether the at least one insurance policy includes a policy feature, the query being formatted in accordance with the API; receive, from the one or more servers of the insurer entity, a response indicating whether the policy feature is associated with the insurance policy; based upon the response, configure the series of component graphic user interfaces; determine that the response indicates that the policy feature is not associated with the insurance policy; exclude a particular component graphic user interface that relates to providing the policy feature from the series of component graphic user interfaces; and/or exclude the policy feature from being included in an interactive element included in a particular component graphic user interface.

Additionally or alternatively to the foregoing executable instructions, the response indicating whether the policy feature is associated with the insurance policy may indicate two or more insurance policies. Additionally or alternatively to the foregoing executable instructions, the parametric event may include one or more of: (i) theft involving the vehicle, (ii) a collision involving the vehicle, and/or (iii) total loss of the vehicle. Additionally or alternatively to the foregoing executable instructions, transmitting the query to determine whether the at least one insurance policy includes the policy feature may further cause the computer system to: configure a particular component graphical user interface to include a selection element configured to enable the user to select between the two or more insurance policies; and/or transmit, to the one or more servers of the insurer entity, a query to determine whether the selected insurance policy includes the policy feature. Additionally or alternatively to the foregoing executable instructions, receiving the indication of the parametric event involving the vehicle may further cause the computer system to: receive vehicle sensor data generated from sensors mounted on or within the vehicle; and/or compare the vehicle sensor data to parametric event data stored on a smart contract deployed on the blockchain, wherein: (i) the parametric event data was generated from an analysis of the vehicle sensor data and/or (ii) the smart contract was configured to (a) receive a transaction from a computing device and/or (b) automatically execute on the blockchain when the transaction indicated that a parametric event corresponding to the smart contract has occurred.

Exemplary Machine Learning

The present embodiments may involve the use of cognitive computing and/or machine learning techniques or algorithms, and/or other modeling techniques. For instance, vehicle sensor data, electronic device data, smart infrastructure, and other types of data generated or collected may be input into machine learning programs that are trained to (i) identify a vehicle collision or crash; (ii) severity of vehicle damage; (iii) damaged vehicle sensors, parts, and/or components; (iv) severity of potential injuries; and/or (v) other vehicle-related events or factors discussed elsewhere herein.

In certain embodiments, the cognitive computing and/or predictive modeling techniques discussed herein may heuristic engine and algorithms, and/or machine learning, cognitive learning, deep learning, combined learning, and/or pattern recognition techniques. For instance, a processor or a processing element may be trained using supervised, unsupervised, or semi-supervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as vehicle data or images, vehicle collision data or images, and/or de-personalized customer data, image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In semi-supervised machine learning, the processing element of an otherwise unknown structure may be broken down into a series of supervised machine learning inquiries to generate a predictive model based on recognized relationships. In one embodiment, machine learning techniques may be used to identify vehicle damage and customize vehicle retrieval and/or repair for individual customers.

Additional Considerations

As noted herein, after collection of the information regarding a vehicle by one or more nodes within a communication network, a transaction (and/or new block) including the vehicle information collected may be broadcast to the blockchain, and/or a new block verified and then added to the blockchain to reflect an updated state of the vehicle. For the computer-implemented methods discussed herein, in some embodiments, a transaction and/or new block may be generated and then broadcast to the blockchain network for verification once vehicle sensor data, and/or other data, have been generated and/or collected by one or more nodes within the communication network. As such, tracking the status of a vehicle may be more reliable and/or fraud-resistant as each node may include a proof-of-identity in its transaction modifying the state of the vehicle and/or vehicle-related blocks or blockchain.

Further, with the computer-implemented methods discussed herein, network participants may function as full nodes that validate and/or generate new blocks and transactions, and/or compile transactions into blocks that are then added to the network. However, not all participants need be nodes that compile transactions into blocks, and/or validate transactions and blocks received from other network participants—as some network participants may wish to rely on other network nodes to provide computer processing and/or storage services that enable usage of the system or blockchain.

In some scenarios, the blockchain may have public interfaces that allow visibility into the data. In certain embodiments, a private blockchain interface may also be used by auto manufacturers, law enforcement, insurers, and regulatory agencies.

An element of smart contracts may also be enabled in the system. Depending on the sequence of events in the blockchain, terms of the smart contract may be executed immediately.

In some embodiments, operators may opt-in to a rewards, loyalty, discount, or other program. The operator may allow a remote server, such as server 115, to collect vehicle sensor data, mobile device data, and other types of data discussed herein. With operator permission or affirmative consent, the data collected may be analyzed to provide certain benefits to operators, as discussed herein.

In some embodiments, the following method and/or system may occur: vehicle sensors may trigger to detect a parametric event; the trigger may send data to the insurer entity's servers indicating that a parametric event occurred; the insurer entity may then attempt to contact the operator of the vehicle directly (e.g., a phone call to the operator) and/or indirectly through an automated system (e.g., the insurer entity's servers send a push notification to an application on the operator's smart device) requesting for confirmation of the collision as well as any other serves to be performed on the operator's behalf (e.g., requesting dispatch of EMTs, police, tow trucks, taxi or ride-share services, vehicle salvage vendors or requesting to contact repair shops or body shops; etc.); receiving the operator's responses; and contacting the selected services and entities in response to the operator's responses. In some embodiments, a timing mechanism might be deployed in the event the operator is unable to respond via the application (e.g., the operator is unconscious or the operator's mobile phone received too much damage to function). When the timing mechanism is triggered, the insurer entity's servers will contact each entity from a set of default settings (for example, a default could be setting the system to call for the dispatch of EMTs, police, and a tow truck as well as a repair shop, but not setting the system to call for the dispatch of a taxi or rideshare or a vehicle salvage vendor or to call a body shop). In some embodiments, the insurer entity may monitor the status of each of the entities contact (e.g., ensuring the ride-share service reached the operator, checking on the status of a repair at a body shop, etc.).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for providing a graphic user interface, the computer-implemented method comprising:

receiving, by one or more processors of a client computing device of a user, vehicle sensor data generated from sensors mounted on or within a vehicle, wherein the vehicle sensor data is indicative of driving, braking, speed, cornering, acceleration, theft of items inside the vehicle, or collisions and wherein the sensors include at least one of a pressure sensor, a gyroscope, an accelerometer, an odometer, a vibration sensor, a microphone, an image sensor, a temperature sensor, a glass break sensor, a radio detection and ranging (RADAR) or a light detection and ranging (LIDAR) sensor;

comparing, by the one or more processors of the client computing device, the vehicle sensor data to parametric event data stored on a smart contract deployed on a blockchain;

determining, by the one or more processors, with the smart contract, an extent of damage to the vehicle by analyzing the vehicle sensor data;

determining, by the one or more processors, with the smart contract, that the extent of damage to the vehicle has exceeded a level;

in response to the determining that the extent of damage to the vehicle has exceeded the level, determining, by the one or more processors, with the smart contract, that a parametric event involving the vehicle has occurred, wherein the smart contract is configured to receive a transaction from a computing device and automatically execute on the blockchain when the transaction indicated that a parametric event corresponding to the smart contract has occurred;

receiving, by the one or more processors, an indication of the parametric event involving the vehicle;

providing, via a display upon receiving the indication, a series of component graphic user interfaces, wherein the component graphic user interfaces are configured to sequentially facilitate:

first, (i) initiating a claim filing and (ii) communicating with an insurer entity, and second, one or more actions of: communicating with a towing service entity, (iv) communicating with a taxi or ride-share service entity, (v) communicating with a vehicle repair service entity, (vi) communicating with a vehicle salvage entity, and/or (vii) communicating with a vehicle rental service entity;

detecting, via the component graphic user interfaces, one or more user interactions, the one or more user interactions including one or more selections of the one or more actions;

performing, by the one or more processors, the one or more actions based upon the one or more user interactions by:

starting a timer when providing a particular component graphic interface; and in response to detecting that the timer reached a threshold amount of time, performing one or more of: (i) initiating a notice of loss, or (ii) communicating with a towing service entity; and in response to detecting a user interaction with any of the particular component graphic user interface, performing the selected one or more actions and halting the timer; and recording, by the one or more processors, a transaction indicating that the one or more actions has been performed to a blockchain.

2. The computer-implemented method of claim 1, wherein performing the one or more actions comprises:

in response to detecting a user interaction with a particular component graphic user interface, determining, by the one or more processors of the client computing device, a location of the vehicle; and transmitting, by the one or more processors of the client computing device, an electronic communication that includes the location of the vehicle to one or more servers associated with: (i) the insurer entity, (ii) an emergency response entity, (iii) the towing service entity, (iv) the taxi or ride-share service entity, (v) the vehicle repair service entity, (vi) the vehicle salvage entity, and/or (vii) the vehicle rental service entity.

3. The computer-implemented method of claim 1, wherein performing the action of communicating with the insurer entity comprises:

transmitting, to one or more servers of the insurer entity, a query to identify one or more insurance policies associated with the user, the query being formatted in accordance with an application programming interface (API) of the insurer entity; and receiving, from the one or more servers of the insurer entity, a response indicating at least one identified insurance policy.

4. The computer-implemented method of claim 3, wherein performing the action of communicating with the insurer entity further comprises:

transmitting, to the one or more servers of the insurer entity, a query to determine whether the at least one identified insurance policy includes a policy feature, the query being formatted in accordance with the API;

receiving, from the one or more servers of the insurer entity, a response indicating whether the policy feature is associated with the at least one identified insurance policy; and based upon the response, configuring, by the one or more processors of the client computing device, the series of component graphic user interfaces.

5. The computer-implemented method of claim 4, wherein configuring the series of component graphic user interfaces comprises:

determining, by the one or more processors of the client computing device, that the response indicates that the policy feature is not associated with the at least one identified insurance policy; and excluding, by the one or more processors of the client computing device, a particular component graphic user interface that relates to providing the policy feature from the series of component graphic user interfaces.

6. The computer-implemented method of claim 4, wherein configuring the series of component graphic user interfaces comprises:

determining, by the one or more processors of the client computing device, that the response indicates that the policy feature is not associated with the at least one identified insurance policy; and excluding, by the one or more processors of the client computing device, the policy feature from being included in an interactive element included in a particular component graphic user interface.

7. The computer-implemented method of claim 1, wherein the parametric event includes one or more of: (i) theft involving the vehicle, (ii) a collision involving the vehicle, and/or (iii) total loss of the vehicle.

8. A computer system for providing a graphic user interface, the computer system comprising:

one or more processors of a client computing device of a user; and a non-transitory program memory coupled to the one or more processors of the client computing device and storing executable instructions that, when executed by the one or more processors of the client computing device, cause the computer system to:

receive vehicle sensor data generated from sensors mounted on or within a vehicle, wherein the vehicle sensor data is indicative of driving, braking, speed, cornering, acceleration, theft of items inside the vehicle, or collisions and wherein the sensors include at least one of a pressure sensor, a gyroscope, an accelerometer, an odometer, a vibration sensor, a microphone, an image sensor, a temperature sensor, a glass break sensor, a radio detection and ranging (RADAR) or a light detection and ranging (LIDAR) sensor;

compare the vehicle sensor data to parametric event data stored on a smart contract deployed on a blockchain;

determine, with the smart contract, an extent of damage to the vehicle by analyzing the vehicle sensor data;

determine, with the smart contract, that the extent of damage to the vehicle has exceeded a level;

in response to the determination that the extent of damage to the vehicle has exceeded the level, determine, with the smart contract, that a parametric event involving the vehicle has occurred, wherein the smart contract is configured to receive a transaction from a computing device and automatically execute on the blockchain when the transaction indicated that a parametric event corresponding to the smart contract has occurred;

receive an indication of the parametric event involving the vehicle;

provide, via a display, a series of component graphic user interfaces, wherein the component graphic user interfaces are configured to sequentially facilitate:

first, (i) initiating a claim filing and (ii) communicating with an insurer entity, and second, one or more actions of: (iii) communicating with a towing service entity, (iv) communicating with a taxi or ride-share service entity, (v) communicating with a vehicle repair service entity, (vi) communicating with a vehicle salvage entity, and/or (vii) communicating with a vehicle rental service entity;

detect, via the component graphic user interfaces, one or more user interactions, the one or more user interactions including one or more selections of the one or more actions;

perform the one or more actions based upon the one or more user interactions by:

starting a timer when providing a particular component graphic interface;

in response to detecting that the timer reached a threshold amount of time, performing one or more of: (i) initiating a notice of loss, or (ii) communicate with a towing service entity; and in response to detecting a user interaction with any of the particular component graphic user interface, performing the selected one or more actions and halting the timer; and record a transaction indicating that the one or more actions has been performed to the blockchain.

9. The computer system of claim 8, wherein performing the one or more actions further causes the computer system to:

in response to detecting a user interaction with a particular component graphic user interface, determine a location of the vehicle; and transmit an electronic communication that includes the location of the vehicle to one or more servers associated with: (i) the insurer entity, (ii) an emergency response entity, (iii) the towing service entity, (iv) the taxi or ride-share service entity, (v) the vehicle repair service entity, (vi) the vehicle salvage entity, and/or (vii) the vehicle rental service entity.

10. The computer system of claim 8, wherein performing the action of communicating with the insurer entity further causes the computer system to:

transmit, to one or more servers of the insurer entity, a query to identify one or more insurance policies associated with the user, the query being formatted in accordance with an application programming interface (API) of the insurance entity; and receive, from the one or more servers of the insurer entity, a response indicating at least one identified insurance policy.

11. The computer system of claim 10, wherein performing the action of communicating with the insurer entity further causes the computer system to:

transmit, to the one or more servers of the insurer entity, a query to determine whether the at least one identified insurance policy includes a policy feature, the query being formatted in accordance with the API;

receive, from the one or more servers of the insurer entity, a response indicating whether the policy feature is associated with the at least one identified insurance policy; and based upon the response, configure the series of component graphic user interfaces.

12. The computer system of claim 11, wherein configuring the series of component graphic user interfaces further causes the computer system to:

determine that the response indicates that the policy feature is not associated with the at least one identified insurance policy; and exclude a particular component graphic user interface that relates to providing the policy feature from the series of component graphic user interfaces.

13. The computer system of claim 11, wherein configuring the series of component graphic user interfaces further causes the computer system to:

determine that the response indicates that the policy feature is not associated with the at least one identified insurance policy; and exclude the policy feature from being included in an interactive element included in a particular component graphic user interface.

14. The computer system of claim 11, wherein:

the response indicates two or more insurance policies, and

transmitting the query to determine whether the at least one identified insurance policy includes the policy feature includes further causing the computer system to:

configure a particular component graphical user interface to include a selection element configured to enable the user to select between the two or more insurance policies; and transmit a query to determine whether a selected insurance policy of the two or more insurance policies includes the policy feature.

15. The computer-implemented method of claim 1, wherein at least four actions of the one or more actions are displayed in a single menu of at least one of the component graphic user interfaces.

16. A system for providing a graphic user interface integrated into a vehicle, the system comprising:

the vehicle;

one or more processors of a client computing device of a user; and a non-transitory program memory coupled to the one or more processors of the client computing device and storing executable instructions that, when executed by the one or more processors of the client computing device, cause the system to:

receive vehicle sensor data generated from sensors mounted on or within a vehicle, wherein the vehicle sensor data is indicative of driving, braking, speed, cornering, acceleration, theft of items inside the vehicle, or collisions and wherein the sensors include at least one of a pressure sensor, a gyroscope, an accelerometer, an odometer, a vibration sensor, a microphone, an image sensor, a temperature sensor, a glass break sensor, a radio detection and ranging (RADAR) or a light detection and ranging (LIDAR) sensor;

compare the vehicle sensor data to parametric event data stored on a smart contract deployed on a blockchain;

determine, with the smart contract, an extent of damage to the vehicle by analyzing the vehicle sensor data;

determine, with the smart contract, that the extent of damage to the vehicle has exceeded a level;

in response to the determination that the extent of damage to the vehicle has exceeded the level, determine, with the smart contract, that a parametric event involving the vehicle has occurred, wherein the smart contract is configured to receive a transaction from a computing device and automatically execute on the blockchain when the transaction indicated that a parametric event corresponding to the smart contract has occurred;

receive an indication of the parametric event involving the vehicle;

provide, via a display, a series of component graphic user interfaces, wherein the component graphic user interfaces are configured to sequentially facilitate:

first, (i) initiating a claim filing and (ii) communicating with an insurer entity, and second, one or more actions of: (iii) communicating with a towing service entity, (iv) communicating with a taxi or ride-share service entity, (v) communicating with a vehicle repair service entity, (vi) communicating with a vehicle salvage entity, and/or (vii) communicating with a vehicle rental service entity;

detect, via the component graphic user interfaces, one or more user interactions, the one or more user interactions including one or more selections of the one or more actions;

perform the one or more actions based upon the one or more user interactions by:

starting a timer when providing a particular component graphic interface;

in response to detecting that the timer reached a threshold amount of time, performing one or more of: (i) initiating a notice of loss, or (ii) communicate with a towing service entity; and in response to detecting a user interaction with any of the particular component graphic user interface, performing the selected one or more actions and halting the timer; and record a transaction indicating that the one or more actions has been performed to the blockchain.

17. The computer-implemented method of claim 1, wherein in response to detecting an initial user interaction before the timer reaches a threshold amount of time, displaying a selected component graphic interface and not starting the timer again before subsequent user interactions with the graphic interface.

\* \* \* \* \*